United States Patent
Benisti et al.

(10) Patent No.: US 8,374,930 B2
(45) Date of Patent: *Feb. 12, 2013

(54) CERTIFIED EMAIL SYSTEM AND METHOD

(75) Inventors: Peter S Benisti, Cote St. Luc (CA);
Steven J Bramson, Hampstead (CA);
Victor M. G. Chaltiel, Las Vegas, NV (US); Philip A Kantor, Las Vegas, NV (US)

(73) Assignee: Trustifi Corporation, Las Vegas, NV (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/486,721

(22) Filed: Jun. 17, 2009

(65) Prior Publication Data

US 2010/0198712 A1 Aug. 5, 2010

Related U.S. Application Data

(60) Provisional application No. 61/149,016, filed on Feb. 2, 2009.

(51) Int. Cl.
*G07F 19/00* (2006.01)
*G06F 15/16* (2006.01)
(52) U.S. Cl. ........................................................ 705/34
(58) Field of Classification Search ................... 705/34
See application file for complete search history.

(56) References Cited

U.S. PATENT DOCUMENTS

| | | | |
|---|---|---|---|
| 5,509,071 A | 4/1996 | Petrie | |
| 5,872,849 A | 2/1999 | Sudia | |
| 6,182,219 B1 | 1/2001 | Feldbau | |
| 6,209,090 B1 | 3/2001 | Aisenberg | |
| 6,327,656 B2 * | 12/2001 | Zabetian | 713/176 |
| 6,393,126 B1 | 5/2002 | van der Kaay | |
| 6,618,747 B1 | 9/2003 | Flynn | |
| 7,051,370 B2 | 5/2006 | Wakino | |
| 7,162,635 B2 | 1/2007 | Bisbee | |
| 7,237,114 B1 | 6/2007 | Rosenberg | |
| 7,240,199 B2 | 7/2007 | Tomkow | |
| 7,266,696 B2 | 9/2007 | Chamberlain | |
| 7,290,143 B2 | 10/2007 | Renier | |
| 7,461,254 B1 | 12/2008 | Rubin | |
| 7,475,249 B2 | 1/2009 | Gaucas | |

(Continued)

OTHER PUBLICATIONS

"ReadNotify Digital Certificate Signature Display & Verification", Sep. 21, 2009.*

(Continued)

*Primary Examiner* — Garcia Ade
(74) *Attorney, Agent, or Firm* — Connie R. Masters

(57) ABSTRACT

A certified email system for providing a time stamp for a presented file, particularly when the presented file is an email. Preferably a demanding party receives the email; generates a unique HASH; digitally signs the unique HASH; and sends the signed HASH and a time-stamp request call to a web services time-stamp conduit (WSTC). The WSTC receives the request and signed HASH from the demanding party and obtains a time stamp. The WSTC sends the time stamp back to the demanding party, which sends a time-stamp notification to the original sender of the email and, optionally, the recipient(s) of the email. Multiple branded or customized demanding servers can efficiently run using one web services time-stamp conduit.

An integrated detailed billing system capable of pass-through client billing, keyword search functionality, a multi-party content management system, and convenient web-based automated verification (file or HASH) services are provided.

30 Claims, 18 Drawing Sheets

U.S. PATENT DOCUMENTS

| | | | |
|---|---|---|---|
| 2002/0007453 A1* | 1/2002 | Nemovicher | 713/155 |
| 2004/0003255 A1 | 1/2004 | Apvrille | |
| 2004/0049521 A1 | 3/2004 | Borrowman | |
| 2004/0255120 A1 | 12/2004 | Botti | |
| 2005/0021571 A1 | 1/2005 | East | |
| 2005/0160272 A1 | 7/2005 | Teppler | |
| 2007/0106912 A1 | 5/2007 | Tanaka | |
| 2007/0118732 A1 | 5/2007 | Whitmore | |
| 2007/0174402 A1* | 7/2007 | Tomkow | 709/206 |
| 2007/0208941 A1 | 9/2007 | Backer | |
| 2008/0022097 A1 | 1/2008 | Gillum | |

OTHER PUBLICATIONS

International Search Report for PCT Application No. PCT/US2010/039094, dated Jan. 27, 2011.

Written Opinion of the ISA for PCT Application No. PCT/US2010/039094, dated Jan. 27, 2011.

RPOST http://rpost.com.

Authentidate http://epm.authentidate.com.

Readnotify http://www.readnotify.com/readnotify/postcert.asp.

* cited by examiner

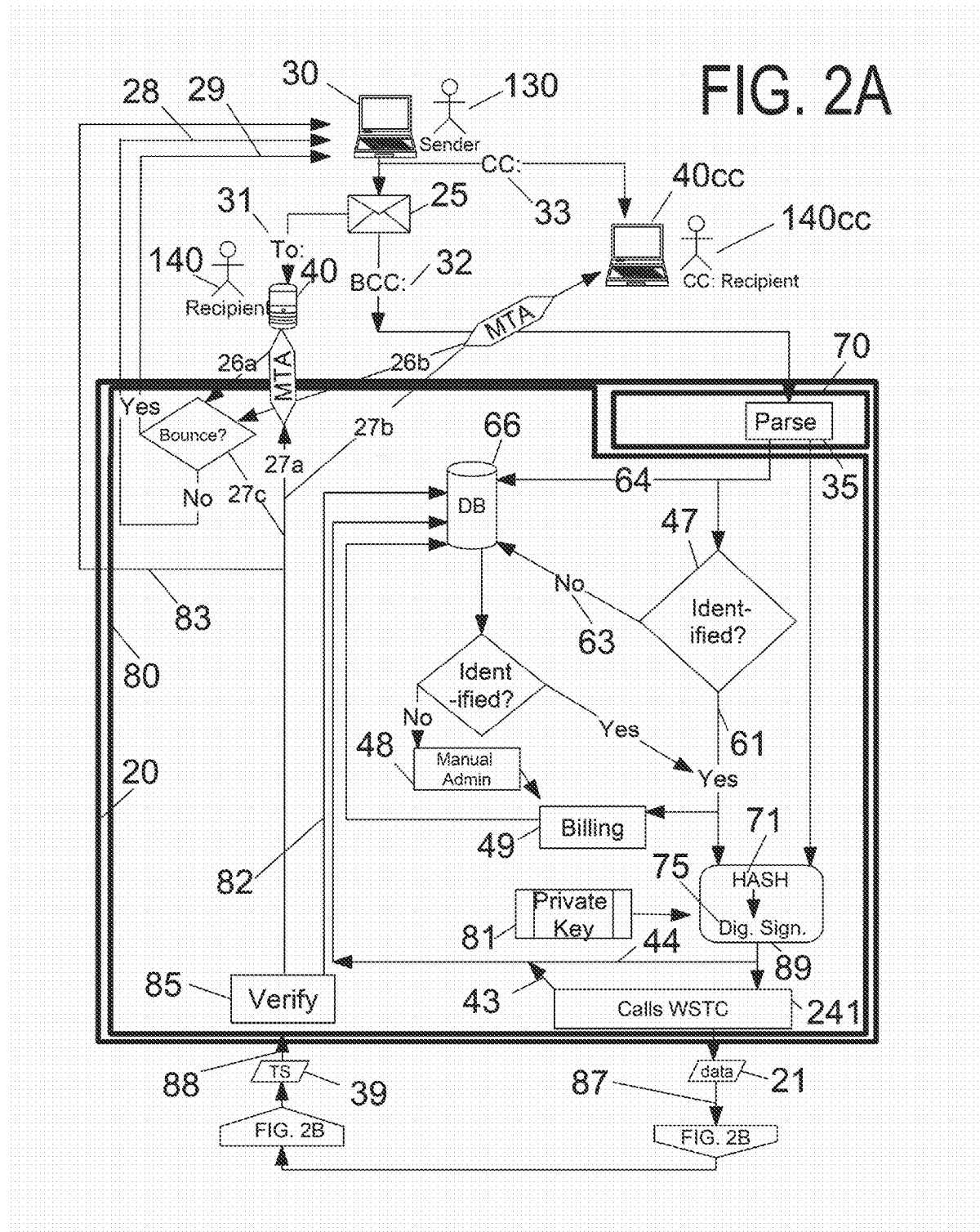

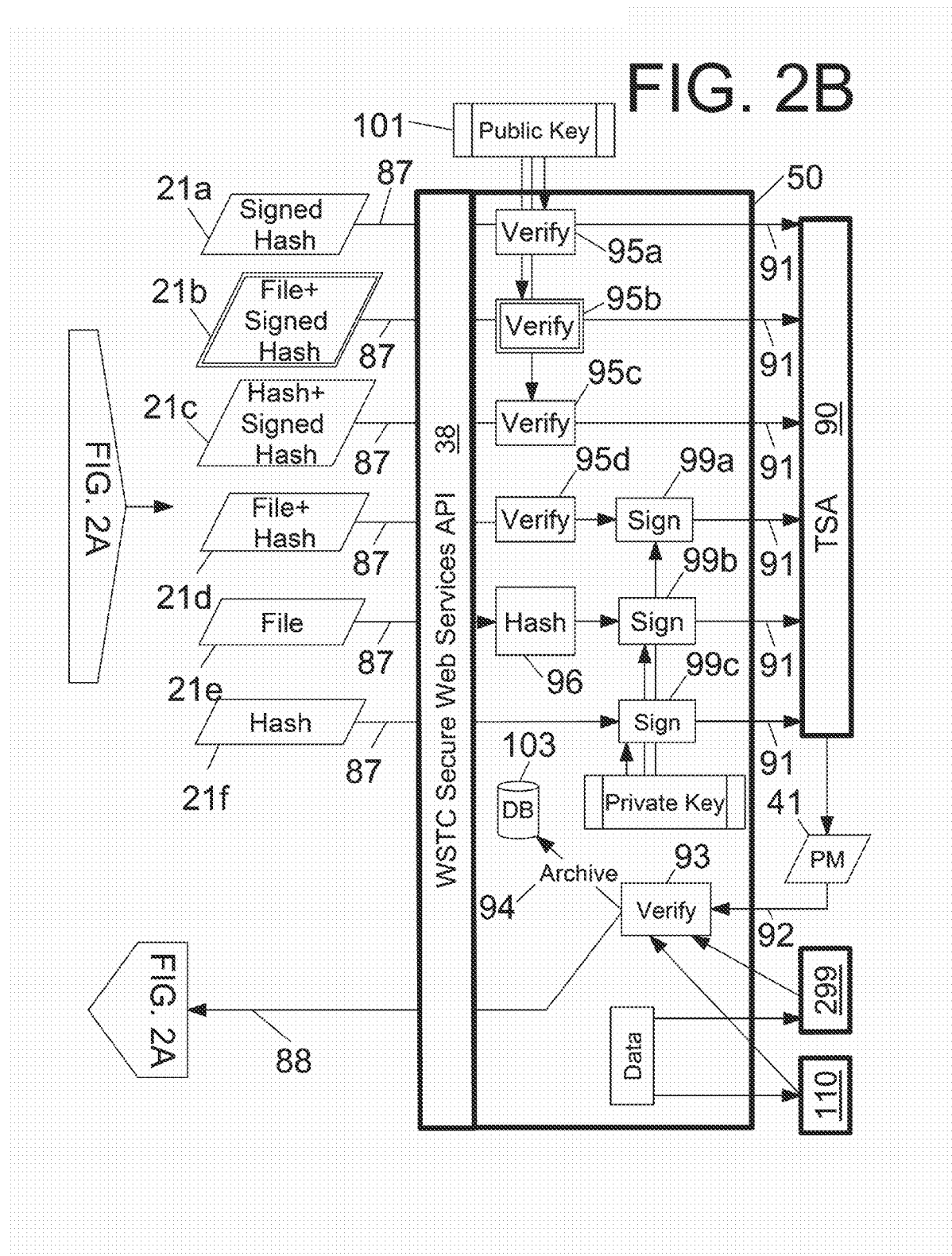

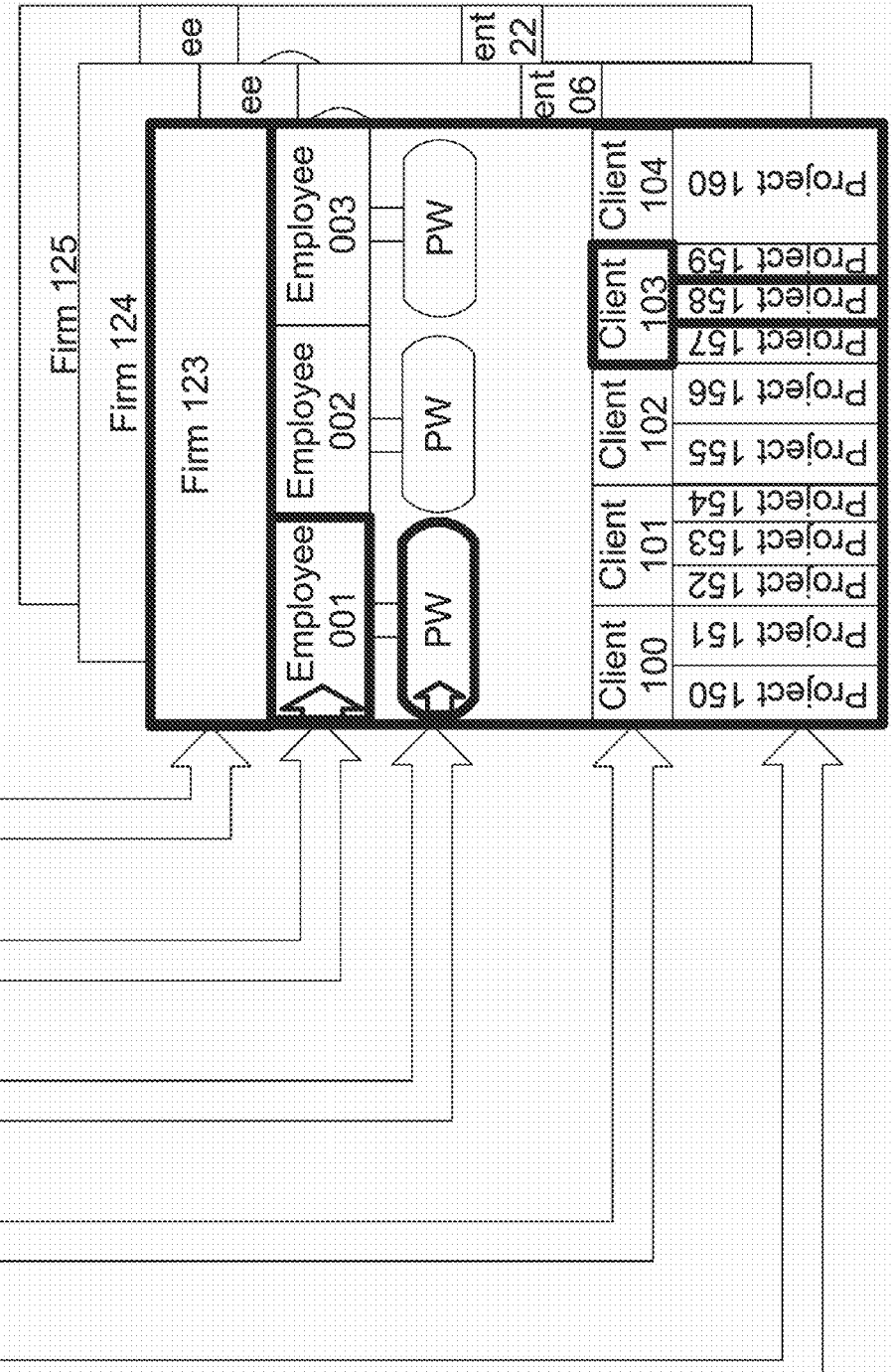

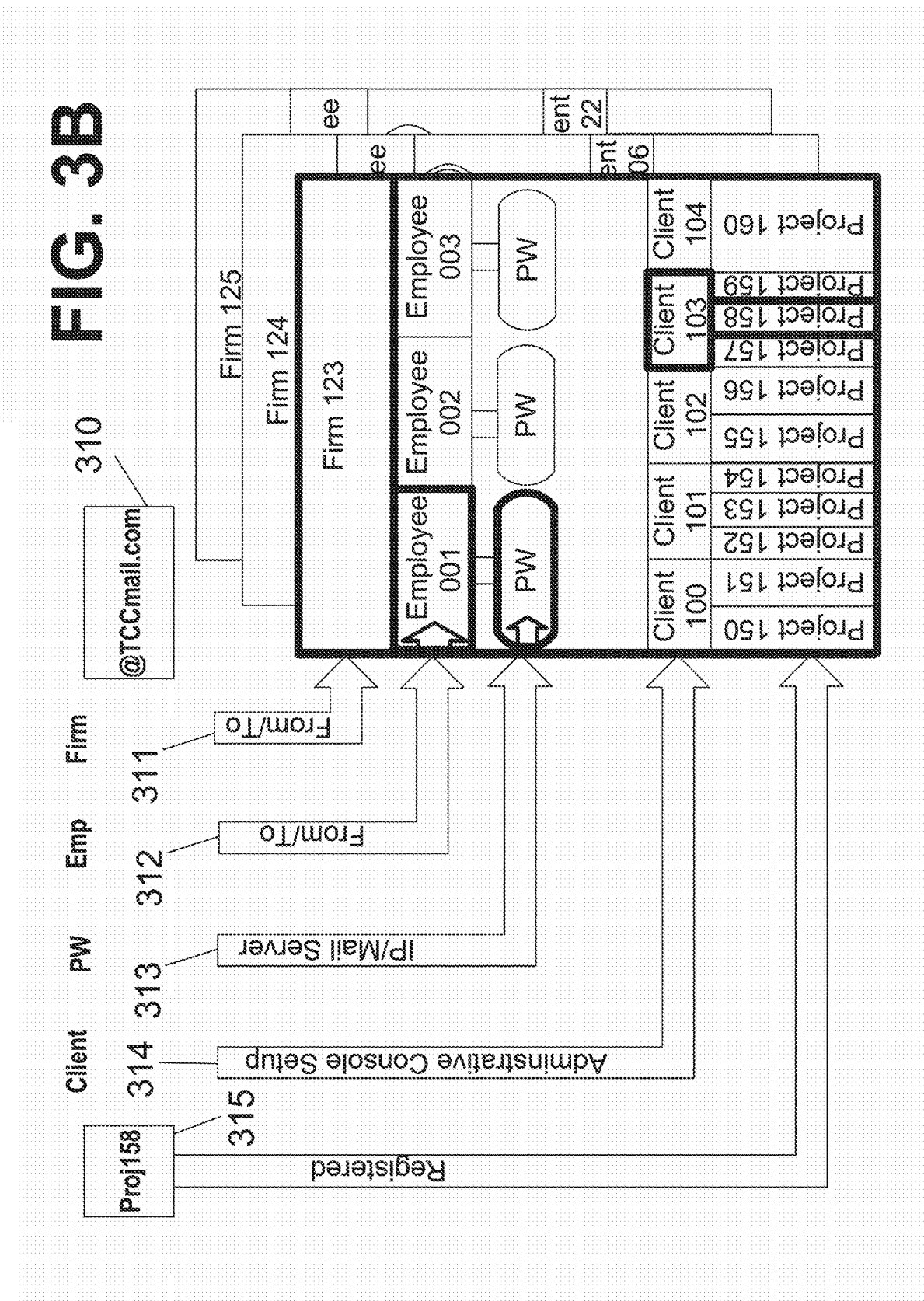

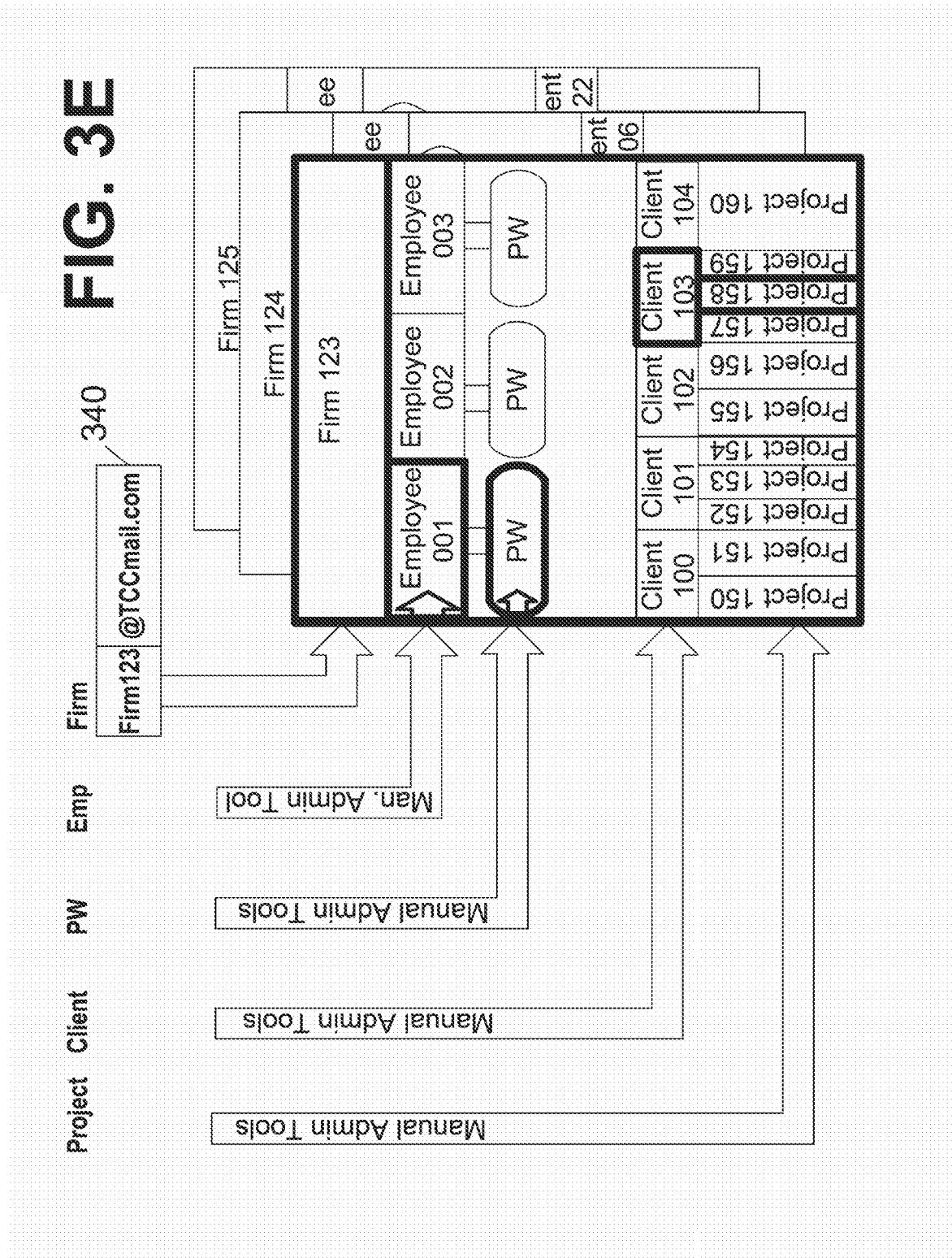

- TSA Postmark — 41
- Link to Verify Time Stamp (opt.) — 242
- Logos (opt.) — 243
- Demanding Party Signature (opt.) — 244
- Viral Marketing Link (opt.) — 245
- Original Email as Attachment /or/ Link (opt.) — 246
- Original Attachments as Attachment /or/ Link (opt.) — 247
- Information on Time Stamping (opt.) — 248
- Offer to Use Subsidized Certified Reply (opt.) — 249

FIG. 5

- Create User Accounts (Manual or Browse/Upload CSV) —Email→  240, 250
- Authorize Participants (Clients, Associates, Advocates) —Email→  251
- Set User & Participant Priviledges / Parameters  252
- Create/Manage TCC:Addressing  253
- Manually associate TS's with clients and projects  48
- Choose Default TSAs and Value-Added Services  255
- Access Repository Logs  256
- View user / credit table  257
- Configure TS Receipt Generation  258
- Project Folder Functions  230
- Create / View Usage Reports (TS and Purchase)  231
- Download /Export Usage Reports (TS and Purchase)  232
- Select Payment Scheme  233
- Purchase Blocks of Credits/Distribute Credits  234
- Manage Digital Certificates  228
- Verify Time Stamp  229

- Change Profile Info (PW/Address/Phone/Email/etc.) — 261
- Access Repository Logs — 262
- Search, Sort, Review Repository Entries — 263
- Search Files and Time Stamped Files — 264
- Download Files and Time-Stamped Files — 265
- Download File Meta Data or Time-Stamp Receipt — 266
- Add Notes — 267
- Create Projects, Set up Project Folders — 268
- Upload Files for Time-Stamping/Reference — 269
- Select Payment Scheme (Opt.) — 235
- Select and/or Manage TCC:Addressing — 237
- Verify time stamps — 238

| 271 | User Account Information |
| 272 | Client TS Email Usage (@tccmail.com) |
| 273 | Participant TS Usage (TCCmail and web based) |
| 274 | Participant's Usage of Files/Emails (View/Download) |
| 275 | Usage of Files/Emails, Web-based (View/Download) |
| 276 | Participant's User Notes |
| 277 | Employee User Notes |
| 278 | Time Stamps + Emails + Attachments |
| 279 | Time Stamps + Web Uploaded Files |
| 221 | Purchase Record (opt.) |
| 222 | TS Registry Logs To Date |
| 223 | Actions of Administrator (Settings, Accounts) |
| 224 | Emails, Attachments, &/or Web Uploaded Files |
| 225 | Project Manipulation (Create/Rename/Move) |
| 226 | System Entries/Notifications |

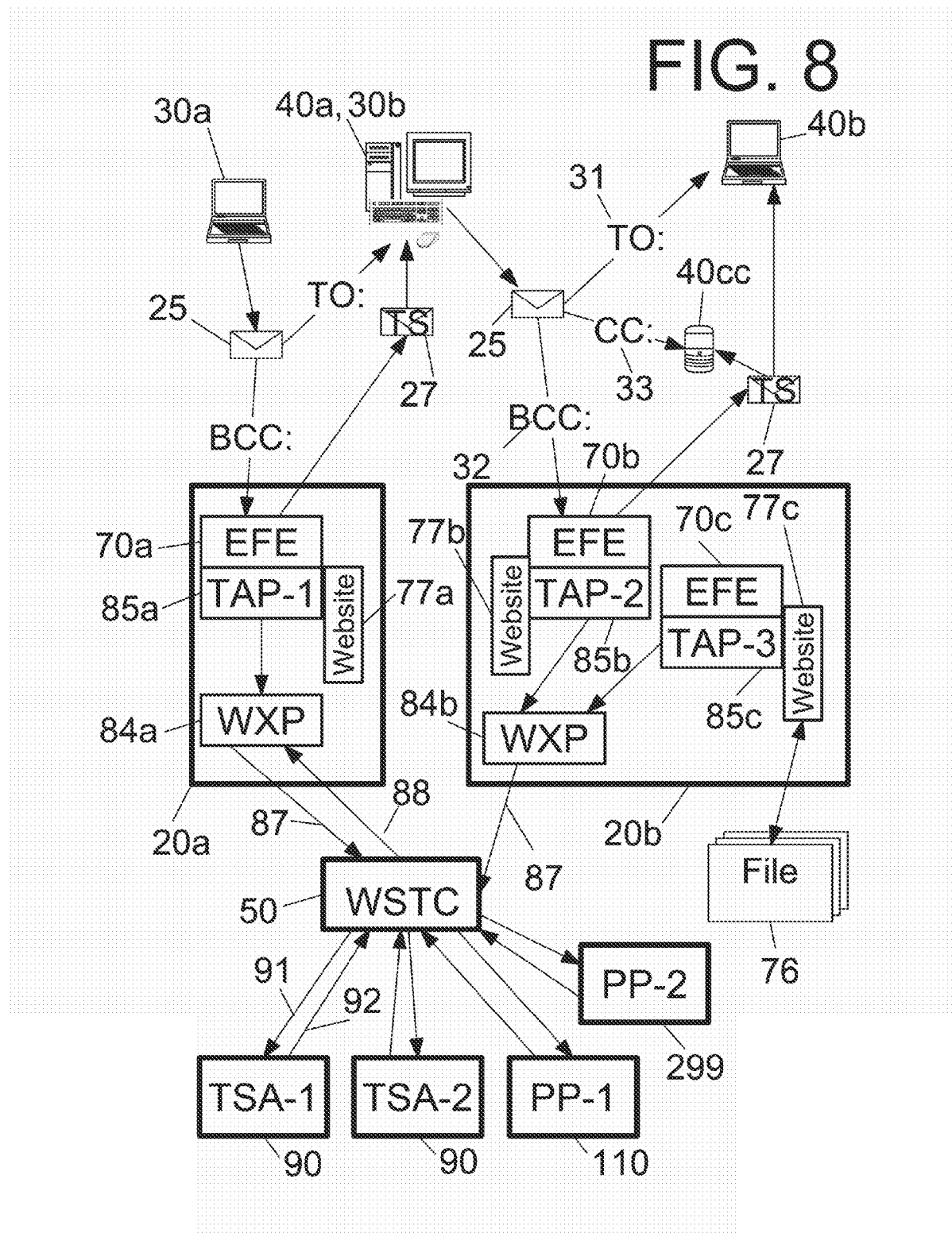

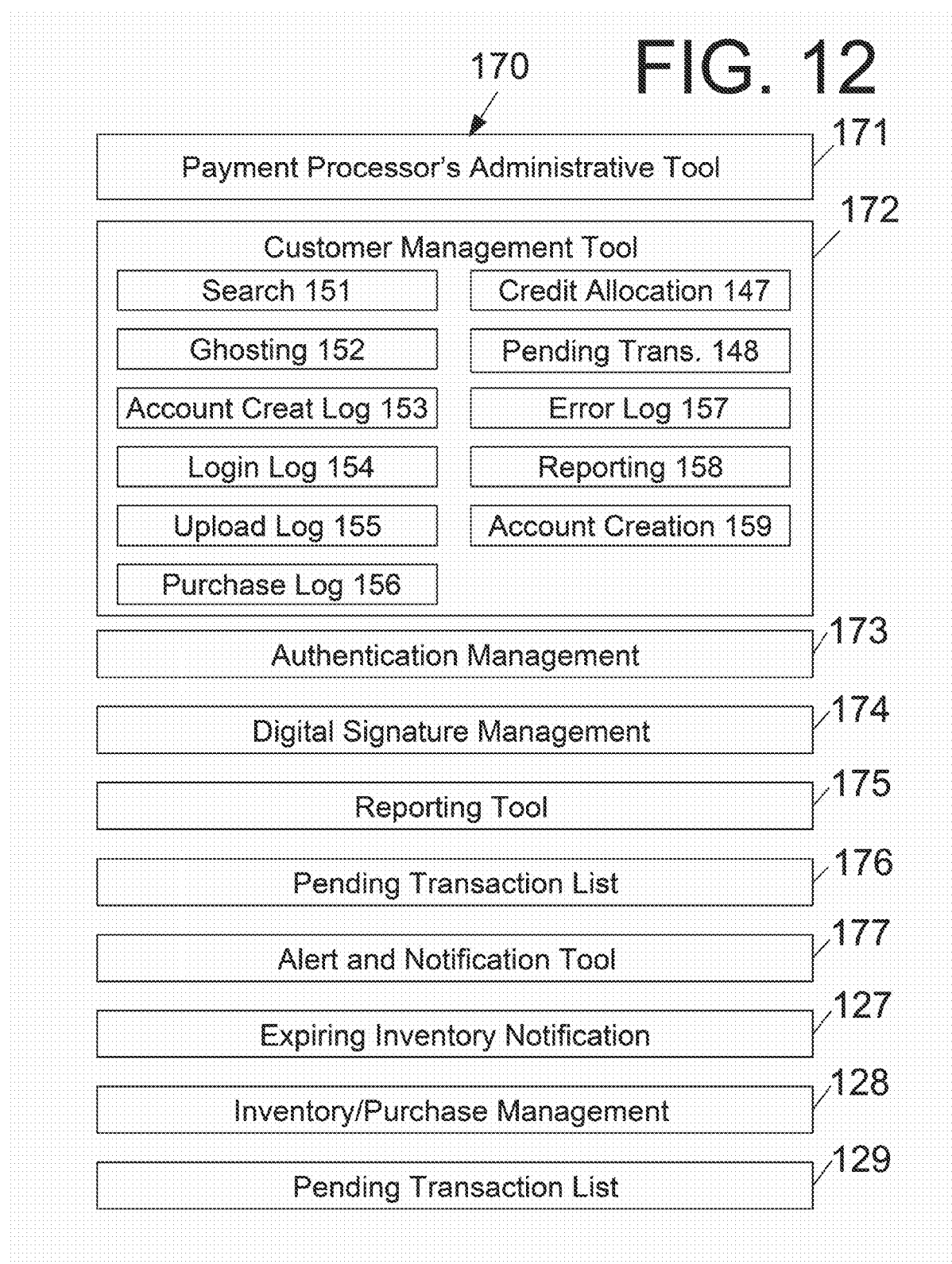

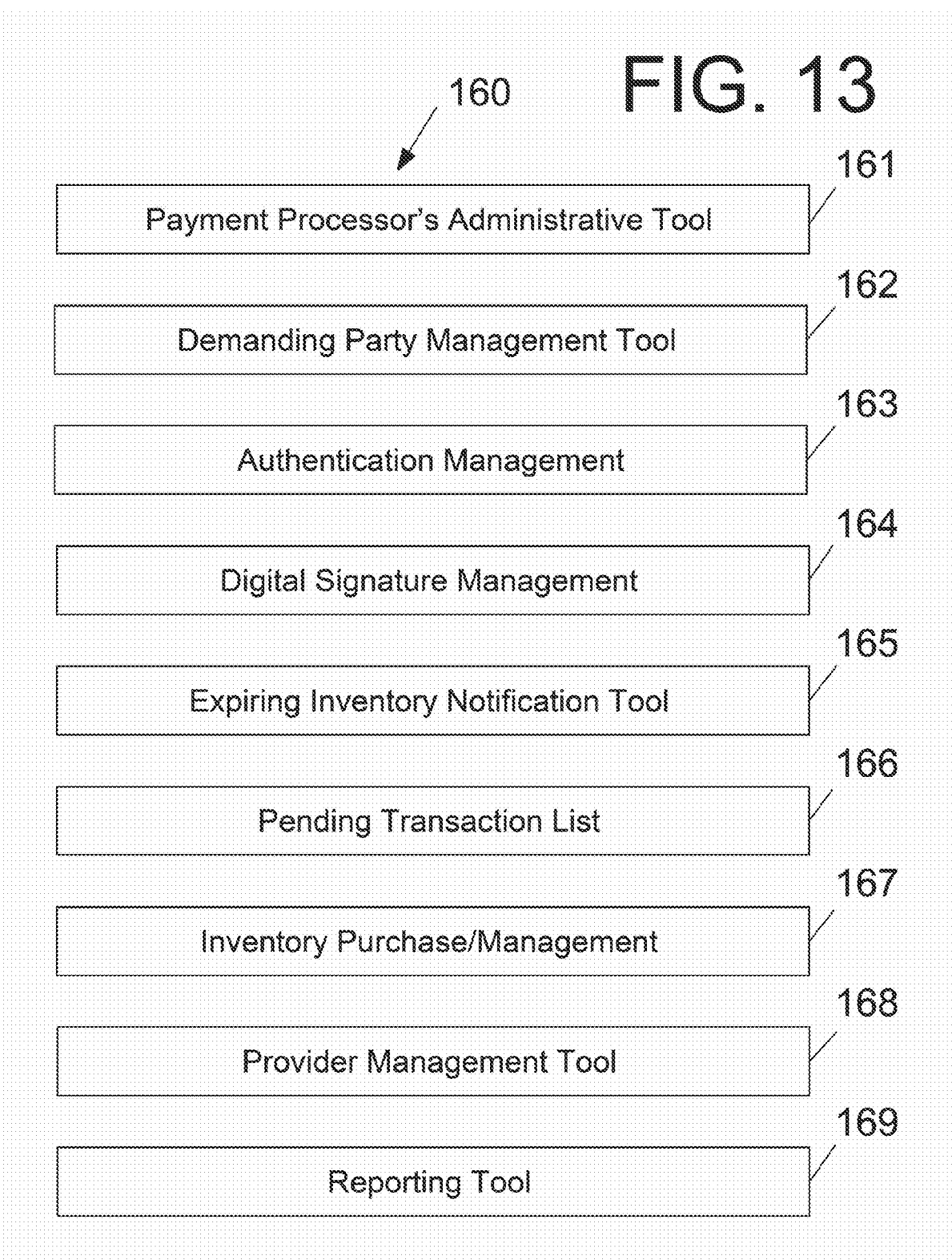

CERTIFIED EMAIL SYSTEM AND METHOD

CROSS-REFERENCE TO RELATED APPLICATION

This Non-Provisional Application claims the benefit of U.S. Provisional Patent Application Ser. No. 61/149,016, filed on Feb. 2, 2009, which is incorporated herein in its entirety.

BACKGROUND OF THE INVENTION

1. Field of the Invention

The present invention relates generally to a certified email system capable of receiving email messages (with any attachments) from any sender computing device; requesting and receiving a trusted third-party time stamp; generating time-stamp notifications; verifying a time stamp of a file or email (with any attachments); parametric searching of archived and time-stamped emails and files; and creating detailed pass-through client/project billing.

2. Description of the Prior Art

The most important business communication system in the world is email. Email has increasingly taken the place of paper-based mail in everyday communication among individuals and between clients, customers, suppliers, business partners and associates. However, paper mail is still used for official correspondence or when a document is delivered to meet a deadline, because paper mail has provided certain advantages that email has heretofore been unable to satisfactorily replicate. Certified paper mail provides an official record through the United States Postal Service that a document was sent, but email systems which seek to provide a verification of sending are cumbersome, typically requiring email to be sent through a web interface or requiring the installation of specialized software or hardware, and wholly dependent upon the reliability of the system provider. Furthermore, many email verification systems have additionally required the cooperation of the email recipient, whether by logging in to a web interface or installing specialized software. This is a significant drawback for any system which does not enjoy near universal usage, and it is a prohibitive obstacle when sending email to recipients who may not want to receive the email, such as would be the case with an emailed eviction notice or the like.

This challenge has been of particular impact to business and other sectors, such as the legal profession, where a significant proportion of correspondence needs proof of service or receipt to meet legal codes and deadlines.

Separately, many businesses charge their clients for expenses incurred while performing work for them, so the fees for certified mail are passed on to these clients. Past email and document certification systems have failed to provide any integrated project or client tracking. Their use would therefore require either a time-consuming manual effort to determine which email might be charged to which client after they are sent, or a tedious process in which a notation of the related client or project would have to be made before each email sent.

Additionally, projects are often assigned to teams having a need for a centralized location to access and to collaborate on a variety of files, documents, and/or emails. Or, in the context of the legal profession, opposing counsel may find benefit in a mutually accessible multi-party digital file depository. Although various archiving and content management systems are available, they do not provide convenient time-stamping of important documents and emails, so do not provide confirmation of data integrity or authentication.

Further, time-stamp verification methods are currently cumbersome. For example, an end user may be presented with an email and a time stamp, with the assertion made that the time stamp verifies the content and date-and-time of sending. Yet to determine if the assertion is true, the end user has to research how to verify the email with the time stamp and then has to perform the steps discovered. This is neither simple nor straightforward. Thus, an easy-to-use verifying tool could be advantageously used with time-stamped emails.

U.S. Pat. No. 7,162,635 issued to Bisbee proposes a system for registering a document in order to provide proof of existence and possession at a particular time. Bisbee's method utilizes a key proprietary to the document's possessor to cryptographically sign a document, and a trusted third party to verify and time-stamp the cryptographically signed document, as well as to cryptographically re-sign it. The Bisbee system provides only proof of existence and possession, and does not provide any means to determine the delivery of the document to any party or to determine the opportunity of any party to have knowledge of the contents of the document.

U.S. Pat. No. 6,327,656 issued to Zabetian provides for a verification system for confirming the delivery of an email. Zabetian's method relies on a trusted third party extracting a digital signature, or unique HASH, from an original document; the HASH is then stored. At some later point in time, the original document can be authenticated by extracting a HASH and by comparing the newly extracted HASH to the first HASH. Zabetian further provides a system for utilizing the verification method to certify emails. This method involves sending an email to a certification server at a trusted third party, such email containing information indicating the intended ultimate recipient of the email and a document to be certified. The certification provider then extracts a digital signature from the document to be certified, records the signature and time, constructs a new email which contains the certified document, and sends the constructed email to the ultimate recipient.

Zabetian's method presents several drawbacks. Since only the unique HASH is stored, this method provides no way for a document to be later retrieved or recreated from the trusted third party should the original copy be lost. Furthermore, this method at no point utilizes cryptographic signing to verify the original possessor or sender of the document. Additionally, the certification provider is the only provider of a time stamp, and is thus required to be fully trusted. There is no provision for obtaining a certification from another provider to obviate complete reliance on the certification provider. Proof of receiving, time, date, and contents of all rely on the integrity of the certification provider for their accuracy.

Finally, the intermediary step in the email delivery process of generating a new email at the trusted third party's certification server causes the sender of the email received by the ultimate recipient to be other than the original sender. This introduces a level of uncertainty as to the authenticity of the email, as well as significantly increasing the chance that the email will be filtered as spam, as the sending email address will not be on any white list utilized by the ultimate recipient, thus leading to a substantially increased likelihood of the email not being seen by the intended recipient.

U.S. Pat. No. 7,240,199 issued to Tomkow again provides for a system which can be utilized for confirming the delivery of an email. Like the Zabetian system, Tomkow's system relies on a system in which the original sender sends an email to a certification server at a trusted third party. In the Tomkow system, the certification server creates a unique HASH of the email and each of its attachments. The certification server then creates and sends new emails for each intended ultimate recipient, with each email from a unique address (based on the time the email was sent and other factors). Tomkow also provides for the possibility of archiving the contents of the email to the certification server, as well providing for obtaining information regarding the success or failure of the delivery to the various addressees.

The system disclosed by Tomkow faces many of the same drawbacks as that of Zabetian. Although the contents of the original sender's email to the certification server may be retained, there is no provision for retaining the email that was actually sent to the ultimate recipients. Since the actual contents of the emails sent to the ultimate recipients are dependent on the processing of the certification server, there is no guarantee of what was actually sent to each ultimate recipient. Likewise, Tomkow provides no facility for cryptographic signing, and requires that the certification provider be the provider of the time stamp. Tomkow has even more severe drawbacks than Zabetian in relation to obfuscating the original sender of the email, with each email to an ultimate recipient coming from a unique email address, so the ultimate user may not be able to set up any white list more stringent than one which allows any email purporting to be from the domain of the certification server. This opens any users of the system to easy exploitation by spam email vendors who may utilize these permissive filters to expose the users to a profusion of nuisance emails.

U.S. Pat. No. 7,051,370 issued to Wakino discloses a similar system in which an original sender sends an email containing original sender information, ultimate recipient information, billing information, and email content to a content verification server, the content verification server sends a request to bill the sender based on the billing information in the email, transmits the email content to the ultimate recipient, and transmits a receipt to the original sender. This system has essentially the same drawback as the Tomkow system and the Zabetian system, in that the email to the ultimate recipient is not from the original sender, but is from the content verification server, and that the time stamp information is obtained from and maintained by the content verification server with no facility to obtain a time stamp from a more trusted source.

U.S. Pub No. 2004/0255120 filed by Botti et al. provides a system for automatically submitting digital files for verification without the need for user intervention (upon occurrence of an event on a computer system, such as saving a document or a specified time of day) in which a file is sent to a remote server, the remote server extracts a unique HASH from the file, and the remote server applies a cryptographic signature to the file and a time stamp acquired from a secure clock. This system has similar drawbacks to the Wakino, Tomkow, and Zabetian systems in that the time stamp is acquired from a clock maintained by the remote server with no provision for integrating a more trusted entity. The Botti system further provides no system to verify the delivery of emails. While the Botti system does provide a system to verify whether a digital copy of a document is the same as an original time-stamped document by regenerating a HASH to compare to the digital signature of the originally submitted document, no provision is made for partial matches, such as email content-only matches.

U.S. Pat. No. 7,290,143 issued to Renier et al. provides a system that is superficially similar to the main function of the Zabetian, Tomkow, and Wakino systems, with some modifications; however, the main point of differentiation is that in the Renier system, the certification and other processing occurs on the telecommunication network having the mailbox associated with the addressee. This restricts the system to sending certified or time-stamped emails to recipients who are running a server implementing the Renier system, making the use of the system at the option of the recipient rather than the sender. This essentially precludes general use for sending certified emails to general users, who cannot be compelled to use mailboxes associated with a server capable of providing certification. Also, service costs cannot be associated with a client of the system user.

The time-stamping systems disclosed in U.S. Pat. No. 6,393,126 issued to van der Kaay et al., U.S. Pat. No. 6,209,090 issued to Aisenberg et al., U.S. Pub. No. 2004/0049521 filed by Borrowman, and U.S. Pub. No. 2005/0160272 filed by Teppler provide for time-stamping documents by relying on the replacement of a computer's internal clock with an assumedly more accurate or secure internal clock. The secure internal clock provides a time with which the local computer can time-stamp a document. All these systems rely on a local clock, which though more secure than a standard clock is still believed to be less secure than a clock maintained by a trusted third party, and the replacement of the local clock with a nonstandard-clock is both troublesome and likely to be error prone and is difficult to integrate with a standard business IT environment. Furthermore, none of the systems provide for any way to verify the delivery of emails or to verify received time stamps.

The system of U.S. Pat. No. 5,509,071 issued to Petrie, Jr. et al. provides a system which is intended primarily for secure purchase transactions, and therefore relies on extensive cooperation from the ultimate recipient. It is therefore not useful for the desired purpose of verification of delivery to a potentially uncooperative recipient, besides the drawback of requiring significant effort for even a cooperative recipient.

U.S. Pat. No. 7,237,114 issued to Rosenberg discloses a system for maintaining a secure cache of individuals' private keys or portions of individuals' private keys to ensure the secure maintenance of the private keys, and a system by which the keys can be temporarily reconstructed or used in a secure environment. The system therefore does not provide for time-stamping documents or verification of delivery of emails.

U.S. Pat. No. 5,872,849 issued to Sudia provides a system for splitting private keys, and though it utilizes public and private keys, it provides no application to certifying, signing or time-stamping documents.

U.S. Pub. No. 2007/0118732 filed by Whitmore discloses a system in which a user sends a file to a remote server, user inputs a username and password or otherwise has their credentials verified, and the remote server signs the document. This system does not provide any system for time-stamping the document, nor a way to verify the delivery of email.

U.S. Pub. No. 2007/0106912 filed by Tanaka provides a system for updating a time stamp over time to ensure that the certification is kept current, and as such is not concerned with the method by which the original time stamp is obtained.

Accordingly, there is an established need for an efficient certified email system and method that provides an end user with a simple interface, that is accessible from any type of email client or service on any sender computing device without requiring software installation, that allows for integrated pass-through client/project billing, that can be integrated with a convenient multi-party archiving and content management system, that provides effective searches of certified email, that provides convenient web-based automated verification services, and that provides digital evidence in the form of a verifiable time stamp of the time and date of sending of the email, of the contents of the email (and any attachments), and of the sender and recipient electronic-delivery addresses.

SUMMARY OF THE INVENTION

The present invention is directed to a certified email system and method that is capable of providing a time stamp, such as an electronic postmark, to an end user via a simple-to-use interface by utilizing a demanding party for receiving and preparing the email and a web services time-stamp conduit (WSTC) configured to serve as a convenient conduit to one or more Time Stamp Authorities for the one or more demanding parties. Thus, both the demanding party interface provided to the end user and the WSTC interface provided to the demanding party are configured for ease of use and access. Throughout this disclosure, unless otherwise indicated by context, the term "time stamp" (and grammatical equivalents) refers to the digital signature that results when a file signature HASH is combined with the time and then digitally signed by a trusted entity.

The demanding party captures the complete email including email-transmission data, parses the coded demanding-party electronic-delivery address (referred to herein as the Trusted Carbon Copy Address [TCC:Address]), prepares the file for time-stamping by generating meta data which include signing of the file's digital HASH value, and passes the prepared conduit-input data with a time-stamp call request to the WSTC. The WSTC then receives, verifies and formats the information, and obtains a time stamp from a Time Stamp Authority (TSA), such as the United States Postal Service Electronic Postmark or EPM® (a postmark receipt containing a unique Identifier, the file signature, the secure time stamp, and a digital certificate). The time stamp is received by the WSTC, verified and preferably archived. Then a receipt-notification email is sent out to the sending and, optionally, to the receiving party (or parties), as desired by the user of the invention.

Provision is further made for convenient web-based automated verification services, such as a Content-Proof Verifying Tool (to conveniently verify the content of a file or email with any attachments after it was sent) and a Verify HASH Tool (to conveniently verify whether a time-stamp receipt is valid for a given file or email with any attachments).

Another aspect of the invention provides a convenient multi-party content management system integrated with the time-stamping function of the certified email system, which provides archiving, collaborating and searching of time stamps and time-stamp-related data.

The time-stamping function of the certified email system is initiated upon receipt of an email message by the demanding party, thus negating the requirement to log into a website or to install software on the sender or recipient computing devices. The email message is addressed to (and transmitted in the normal way to) both the recipient(s) (using the "TO: Address" field) and to the demanding party TCC:Address (generally using the "BCC: Address" field—but optionally using the "TO: Address" field or "CC: Address" field), and, optionally, to any carbon copy recipient(s) (using the "CC: Address" field or the "BCC: Address" field). The coded TCC:Address preferably contains one or more IDENTIFIERS.

An integrated client billing system is based on the one or more address IDENTIFIERS coded into the local part of the TCC:Address (or, at times, optionally or additionally, based on email-transmission data or manual cataloging). The IDENTIFIERS can be parsed to derive detailed billing parameters (such as corporate, user, client, and/or project billing-associated details), allowing pass-through billing for clients and projects. Billing-associable details may also be derived from the email header, transmission data, addresses of the sender or recipients, and/or manual cataloging.

An object of the present invention is to provide a certified email system and method that provide irrefutable evidence of an email's contents, time of sending, and recipient electronic-delivery addresses.

An additional object of the present invention is to provide a web services time-stamp conduit that is usable by one or more demanding parties to conveniently request and receive a time stamp.

A further object of the present invention is to provide a certified email system and method that are adapted for use with any email service or client (e.g., Outlook®, Lotus®, Gmail®, Microsoft Exchange®, etc.) on any computing device capable of sending email (e.g., Windows® computer, Apple® computer, iPhone®, BlackBerry®, etc.).

Another object of the present invention is to provide a certified email system and method that require no plug-in, client download, or software installation on the sender or recipient computing devices.

A further object of the present invention is to provide a certified email system and method that do not require configuration changes on the MUA (Mail User Agent).

Another object of the present invention is to provide a certified email system and method that do not require any installation or configuration for the MTA (Mail Transfer Agent).

An additional object of the present invention is to provide a certified email system and method that, in one aspect, provide detailed billing.

Another object of the present invention is to provide a certified email system and method that do not require the end user to login to a website to use the system.

A further object of the present invention is to provide a certified email system and method that do not require a cooperative recipient.

Another object of the present invention is, in one aspect, to provide a certified email system and method that automate the process of verifying whether a time-stamp receipt is valid for a given file.

An additional object of the present invention is to provide a certified email system and method providing users with a multi-party archiving and content management system incorporating convenient time-stamping of documents and emails.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIGS. 2A and 2B present schematics representing an overview of the time-stamping function of the certified email system and method of the present invention;

FIGS. 3A to FIG. 3E present schematics of exemplary addressing schemes usable in the TCC:Address and, after parsing, associable to billing-associable details, of the certified email system and method of the present invention;

FIG. 4 presents a schematic of components of the email receipt-notification of a time stamp as presented to the sender and/or sender's designate and, optionally, email recipient(s), as provided by the certified email system and method of the present invention;

FIG. 5 presents a schematic of the tools and functions available to a corporate administrator via a corporate administrative console of the certified email system and method of the present invention;

FIG. 6 presents a schematic of tools and functions available to a user or participant via a user/participant console of the certified email system and method of the present invention;

FIG. 7 presents a schematic of the registry logs of the certified email system and method of the present invention;

FIG. 8 presents a schematic of exemplary architectural components of the certified email system and method of the present invention;

FIG. 12 presents a schematic of the demanding party administrative dashboard available to the demanding party administrator of the certified email system and method of the present invention; and FIG. 13 presents a schematic of the WSTC administrative dashboard available to the WSTC administrator of the certified email system and method of the present invention.

Like reference numerals refer to like parts throughout the several views of the drawings.

DETAILED DESCRIPTION OF THE PREFERRED EMBODIMENTS

Figure 1:
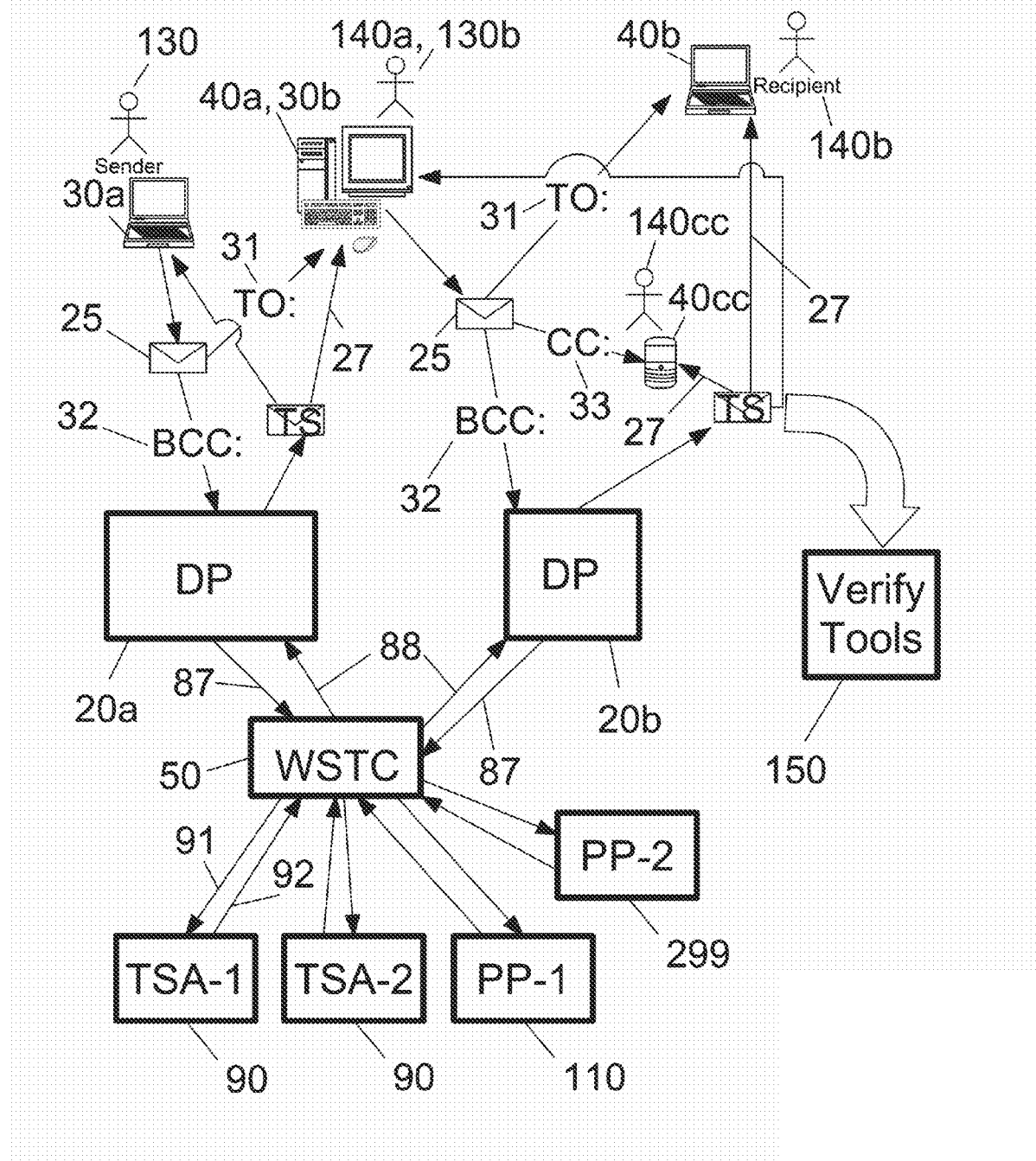
FIG. 1 presents a schematic representing an overview of the interactions of components of the certified email system and method of the present invention.

Shown throughout the figures, the present invention is directed toward an efficient, user-friendly certified email system and method that provide a time stamp or electronic postmark for presented files from any file presenter. Particularly, the presented file may be an email from a sender presented via a simple-to-use interface. Optionally and additionally, the presented file may be presented by a user of the integrated user/participant console. The certified email system receives the presented file, prepares the presented file for time-stamping, obtains the time stamp, archives the time stamp and a variety of optional time-stamp-related data, and provides convenient access, control, searching, and reporting to both administrators and users of the system.

Preferably, the certified email system comprises a demanding party and a web services time-stamp conduit (WSTC), but other architectures are within the scope of the invention. Preferably, the demanding party receives the email and prepares the email for transmission to the WSTC. The WSTC is configured to serve the demanding party (or multiple demanding parties) as a convenient conduit to one or more providing parties, such as one or more Time Stamp Authorities and/or third-party archiving services. Thus, both the demanding party interface provided to the user and the WSTC interface provided to the demanding parties are configured for ease of use and access.

While the certified email system and method of the present invention may be profitably used by an individual, the present invention is generally discussed herein as applied to a company, an organization, firm, or other business entity, which may have multiple users and may allow multiple participants to collaborate with the company users through use of a provided content management system. This is done to illustrate the system in its fullest functionality; however, other users may use only a portion of the services and functions available, which is also within the scope of the invention. Therefore, for example, though charges for time stamps or other providing party services are generally herein discussed as charged to a "corporate account" and the administrative console is referred to as a "corporate administrative console," an individual or home business owner may equally well use the corporate account for billing and the corporate administration console to manage provided services.

Also, while the certified email system and method of the present invention is frequently described herein with reference to a law or accounting firm, this is not intended to limit the invention to a particular vertical market or even to anything that could be called a "market." Rather, the present invention is intended to serve the purposes of any user of email, individually or as part of an organization.

The certified email system and method works with any email client or service (running on any computing device)—without requiring the sender or recipient to login to a website to use the system, without requiring the sender or recipient to install software or an email client plug-in, and without requiring a cooperative recipient. Further, no changes are required to the corporate mail server or the client mail server.

The certified email system and method provide convenient web-based administration for users to manage various aspects of the time-stamping functions; provide a multi-party archiving and content management system incorporating convenient time-stamping of documents and emails (allowing complete transparency in negotiations, mediations, consultations, discussions, etc.); allow for integrated detailed billing, including pass-through client/project billing for the convenience of the company, which can conveniently bill a client for time stamps used and/or services rendered; provide effective searches of data registries that include archived certified email and other project-correlated data; and provide convenient web-based automated verification services. The certified email system and method provide a guarantee of data integrity (confirmation that the data have not been tampered with), non-repudiation (confirmation that the email transmission took place), and a secure verifiable time stamp (a guarantee that the email transmission took place at a specific time).

While the certified email system allows documents of any type to be time-stamped, it is particularly focused on email processing. However, as the email is presented in a digital file format, much of the functionality is equally applicable to files of other digital file format types (for example, WMV, JPEG, WAV, MP3, PDF, DOC, XLS, PPT, etc.). Also, while the certified email system is particularly directed to using a coded email address within a user's regular email client or service, much of the certified email system functionality is applicable to time-stamping requests made at a web console, such as may be desired when using the provided multi-party archiving and content management system integrated into the system.

Referring to FIG. 1, an overview of the time stamp function of the certified email system is presented. The certified email system utilizes a demanding party (DP) 20a, 20b and a web services time-stamp conduit (WSTC) 50; as illustrated, optionally more than one demanding party (20a, 20b, etc.) may run on a single WSTC 50.

The demanding party 20 is designed for general use to provide time-stamping, registry, database, archiving, customer account administration, and firm/corporate administration functionality. The demanding party 20 can comprise multiple adaptations, interfaces, servers, and front ends for different vertical markets, customized to the requirements of the demanding party operator. The architecture within the demanding party 20 can also vary, with an exemplary architecture described below in FIG. 8.

The WSTC 50 is designed to receive requests for services 87 (with associated prepared conduit-input data 21, FIG. 2A) from the demanding party, and to process them on its own or with one or more third-party providing parties (particularly Time Stamp Authorities [TSA-1, TSA-2] 90, but, optionally, other providing parties [PP-1, PP-2] 110, 299). The WSTC 50 prepares and executes requests as per the required methods of the providing third party. In this way, with the WSTC 50 serving as the manager and translator of service requests, this functionality is offloaded from the web-based application(s) of the demanding party 20. Thus, the WSTC 50 provides a robust conduit that the demanding parties 20 can use to access the providing parties 90, 110, 299. This modular architecture is scalable and flexible.

Therefore, setting up a demanding party 20 is simplified to merely writing an interface to the WSTC without the need to create custom interfaces to the one or more providing parties 90, 110, 299 offered by the WSTC. Thus, the creation of the different adaptations and front ends for different vertical markets is facilitated, with the ability to easily incorporate reliable trusted time-stamping (and, optionally, archiving and other services) provided by the WSTC. In addition, the WSTC preferably consolidates the transactions of many demanding parties 20 and, therefore, benefits from economies of scale, including lower per transaction costs, lowering costs to users and to their clients.

The time stamp function of the certified email system is generally initiated by an email message 25 from a sender computing device 30. The receipt by the demanding party 20 of the email 25 addressed to the demanding-party electronic-delivery address (referred to herein as the TCC:Address) serves to solicit the obtaining of a time stamp and the charging of the cost of the time stamp to the user's account. The demanding party 20 is coupled via a wide area network (typically the Internet) to a plurality of sender computing devices 30 and receiver computing devices 40. The email message 25 is addressed to at least one recipient electronic-delivery address (generally using the "TO: Address" field 31) and is transmitted to the recipient computing device(s) 40; the email message 25 is also addressed to the TCC:Address (generally using the "BCC: Address" field 32) and transmitted to the demanding party 20; and the email message 25 may be further addressed to, and further transmitted directly to, any optional carbon copy recipient computing device(s) 40cc (using the "CC: Address" field 33 or "BCC Address" field [not shown]). Thus the email 25 is transmitted directly to the recipient computing device(s) 40 without passing through servers of the demanding party 20, with the copy of email 25 (addressed to the demanding-party electronic-delivery address) received by the demanding party 20 serving as a solicitation to obtain a time stamp for the email 25. The coded demanding-party electronic-delivery address may contain one or more IDENTIFIERS (such as name value pairs) associable with billing information and usable for reporting categories of usage (such as project, client, company, etc.).

The demanding party 20 is configured to receive the email message 25 and to use the email message 25 to prepare the file for passing 87 to the WSTC as conduit-input data 21 (FIG. 2A) with a time-stamp request call 241. As shown in FIG. 2A, the demanding party 20 is further configured to transmit a notification 28, 29, 83 to the sender computing device 30 and (optionally) to transmit a notification (27a or 27b) to the recipient computing device 40 to alert the recipient 140 of the certification of the email.

The WSTC 50 is configured to accept from a demanding party 20 one time-stamp request call 87 for a presented file or redundant time-stamp request calls 87 for a presented file; configured to act upon the time-stamp request call(s); configured to output 88 the time stamp(s) to the demanding party 20; configured to receive and act upon other service calls (FIG. 11), and, optionally, configured to provide other value-added services (either locally by the WSTC or by a third party 110, 299), such as archiving services.

Not only does a single web services time-stamp conduit (WSTC) 50 provide a convenient, efficient conduit to one or more third-party Time Stamp Authorities 90, it may also, itself, serve as a Time Stamp Authority. Consequently, acting upon the time-stamp request call(s) may comprise transmitting 91 a time-stamp request to a TSA 90 and receiving 92 the time-stamp back from the TSA 90 and/or may comprise time-stamping the file within the WSTC 50. Thus, redundant time-stamp calls may or may not include the WSTC 50 itself as a TSA.

The Time Stamp Authority (TSA) 90 provides trusted proof of content integrity as of a specific point in time, so it can be used to verify the authenticity of the file. Particularly, the certified email system is designed to efficiently utilize the legally enforceable time-stamping and digital signature verification solution from the United States Postal Service (USPS) to establish evidence of digital files, but will also integrate with UPU (Universal Postal Union) compliant post mark services of many Post Offices, or other time-stamp providers. The USPS offers an electronic postmark (EPM®), which is an auditable time-and-date stamp service.

The sender computing device 30 and the recipient computing device 40 may be any desired computing device capable of sending and receiving email, such as, for example, a BlackBerry 40cc, an iPhone, a desktop 40a, a laptop 30a, etc. using any operating system (such as, for example, Windows®, Mac OS®, Linux®, etc.). The sender computing device 30 and the recipient computing device 40 may send or receive email through any desired email service or client (such as, for example, Microsoft Outlook®, Yahoo®, Gmail®, Lotus®, Microsoft Exchange®, or other Mail User Agents [MUA]). As is conventional, mail sent via a MUA of the sender computing device 30 is generally transmitted through multiple Mail Transfer Agents (MTA) before receipt by the MUA of the recipient computing device 40.

As illustrated, a single computing device 40a, 30b can function in one email message transmission as a sender computing device 30b (sending email to recipients 40b and 40cc) and in another email message transmission as a recipient computing device 40a (receiving email from sender 30a), using the same demanding party (not shown) or different demanding parties 20a, 20b, as illustrated. Particularly if the sender computing device 30a and the sender/recipient computing device 40a, 30b are participants in a project as described below, numerous time-stamped emails may be transmitted between them, all being passed to a single demanding party 20a for time-stamping (not shown).

A variety of customizations, options, reports, settings, and management tools—as well as searching utilities and the multi-party archiving and content management system—are accessible via the corporate administrative console (FIG. 5). End user and participant tools and settings are available via the user/participant console (FIG. 6). Other administrative tools also presented include the demanding party administrative dashboard 170 (FIG. 12) and the WSTC administrative dashboard 160 (FIG. 13).

Referring to the more detailed view of FIG. 2A and FIG. 2B, to send a certified email (generally after an account has been created and a method of payment chosen), the sender 130 composes the email message 25 (and attaches any desired attachments) using any desired email client or service. The sender 130 addresses the email 25 to the recipient(s) 140 and to the demanding party 20 and to any carbon copy recipient(s) 140*cc*. The coded demanding-party electronic-delivery address (TCC:Address), usually in the "BCC: Address" line 32, may read, for example, "[Identifier]@tccmail.com" where the local part of the email address, "[Identifier]," is billing-associable identifying information (associable with the sender 130 seeking certification or associable with the recipient(s) 40), and where the domain-part of the email address, "tccmail.com," directs the BCC: copy of the transmission to the demanding party 20. (While the "BCC: Address" field 32 is typically used to send the email 25 to the demanding party 20, and will be referred to herein, using the "TO: Address" field 31 or the "CC: Address" field 33 to send the email 25 to the demanding party 20 is within the scope of the invention.) The complete email 25 (including any attachments) is then sent as usual, with the email message 25 delivered to the recipient computing device 40 (or to multiple recipient computing devices), delivered to the demanding party 20 (using the TCC:Address, generally via the "BCC: Address" field 32), delivered to any other BCC: recipients (not shown), and delivered to any CC: recipient computing device(s) 40*cc* (using the "CC: Address" field 33).

After the demanding party 20 receives the incoming email message 25 (including email body, email addresses, and any attachments, and transmission data [added by MTA or MUA]) from sender computing device 30, it parses 35 the TCC:Address ([Identifier]@tccmail.com) and email-transmission data (for example, the address fields of the sent email ["TO: Address" 31 [recipient address], the "FROM: Address"], the header, the IP address of the sender, etc.). The data derived from the TCC:Address and the email-transmission data (and, at times, manual cataloging association) comprise billing-associable details, which are associable with, and usable for, billing, reporting, cataloging, and/or archiving purposes. Addressing schemes and derivation of associations are discussed in more detail later (in FIGS. 3A to 3E). The parsed billing-associable details may be archived 64 in database 66. The complete unparsed email may also be archived.

Based on parsing 35 of the TCC:Address or the email-transmission data, the demanding party 20 identifies the user. When using some addressing schemes, the username, firm, client, and/or project are identified 47 directly 61 from the parsing of the TCC:Address. Using other addressing schemes, the username, firm, client, and/or project are identified indirectly 63 by consulting the database 66. If the username, firm, client, and/or project are not 63 fully identifiable from the parsing 35 and are not fully identifiable by consulting the database 66, manual categorization or cataloging 48 can be performed by accessing the administration console (FIG. 5). Once sufficient billing-associable details have been determined for identification, the appropriate corporate billing account is billed 49 (FIG. 2A) with the billing cost preferably associated and catalogued to the company's client and/or project. If a client and/or project are identified by the TCC:Address, but are not already pre-defined as associated with the user, they may be created in the database 66.

The demanding party 20 prepares 89 the email 25 for transmission 87 to the web services time-stamp conduit (WSTC) as conduit-input data 21 (FIG. 2B). If needed and desired, the demanding party 20 can convert files to a standard format. Preferably, the demanding party 20 uses a hash algorithm 71 to obtain a HASH value derived from the email or file, encodes the HASH with a conventional Public Key Infrastructure (PKI) signing algorithm 75 using its private key 81, and archives 44 the digitally signed email or file.

The demanding party 20 may further archive any or all of a variety of data, such as, for example, filing 43 the time-stamp request to the WSTC, filing 82 the obtained time stamp, filing 64 parsed billing-associable details, filing the HASH value, archiving the original received email (including the email body, any attachments, recipient and sender electronic-delivery addresses, and/or email-transmission data) and/or archiving 44 the digitally signed email or file. Additionally, the demanding party 20 preferably provides a web presentation interface to users.

After preparing the conduit-input data 21 the demanding party 20 makes a time-stamp request call 241 to the WSTC 50 and transmits 87 the conduit-input data 21 (preferably the original email 25 and the digitally signed HASH and, optionally, a copy of the public key).

Referring now to FIG. 2B, the WSTC 50 is illustrated. In overview, the WSTC preferably verifies 95 the conduit-input data 21, requests 91 and receives 92 a time stamp from one or more Time Stamp Authorities 90, may optionally archive 94 data, and outputs 88 the obtained time stamp 39 to the requesting demanding party 20. Both transmission 87 to the WSTC and transmission 88 back from the WSTC to the demanding party are preferably, but optionally, performed using secure web services 38.

The WSTC performs cross-checks of the conduit-input data 21, when possible. Although preferably the digital file and the signed HASH 21*b* are provided 87 to the WSTC as conduit-input data 21 from the demanding party 20 (to allow cross-checking), other file-type combinations (e.g., signed HASH 21*a*, HASH and signed HASH 21*c*, file and HASH 21*d*, file 21*e*, HASH 21*f*) can be accepted. Thus, the WSTC provides a versatile, flexible interface for various demanding parties 20 with various requirements or limitations. As illustrated in FIG. 2B, the processes performed by the WSTC are dependent upon the file types 21*a* to 21*f* that are passed to the WSTC. For example, if an unsigned file (21*d*, 21*e*, 21*f*) is passed to the WSTC, the WSTC signs (99*a*, 99*b*, 99*c*) the file; or if an unhashed file (21*e*) is presented, the WSTC hashes 96 the file and then signs it 99*b*.

Most preferably, the file and the signed HASH 21*b* are passed via the WSTC secure web service's application programming interface (API) 38, the signed HASH and file are verified 95*b*, and they are transmitted 91 to the time stamp authority 90. (Optionally, the WSTC 50 may itself serve as a time stamp authority.) The WSTC then receives 92 the postmark receipt from the time stamp authority 90. For example, if the time stamp authority used is the USPS, the EPM® receipt contains the following: (1) a unique time-stamp identifier; (2) the file signature HASH; (3) the obtained secure time stamp; (4) a digital certificate; and (5) a copy of the file signature received by the TSA from the WSTC.

If the time-stamp service is not available at the time of the transaction, the WSTC places the transaction in a batch to be processed on a first-in, first-out basis when the service becomes available again; in this case a temporary informational receipt (provided by the WSTC) is provided to the demanding party 20 (and possibly passed on to its customer, user/sender 30) along with status updates until a follow-up notification may be received confirming the successful completion of the postmark and triggering an update of the registry logs 270 (FIG. 7).

The WSTC then preferably verifies the received postmark receipt (e.g., EPM®) from the time stamp authority. The WSTC may perform other services, such as archiving 94 the received conduit-input data 21 and postmark 41 data in database 103 and/or a third-party data storage facility 110. Optionally, the WSTC may archive particular sets or subsets of the data 21 and postmark 41 data in database 103 or third-party data storage facility 110. Thus, redundant archiving is optionally provided, within the system itself and/or by utilizing a third-party storage facility 110, for example, redundancy may be by means of mirrored discs, database writes streamed to a remote system, regular backups, or utilizing both archiving in database 66 of the demanding party and archiving in database 103 of the WSTC or third-party data storage facility 110. The extent and degree of redundancy is customizable by the operators of the WSTC and of the demanding party and, to a lesser extent, by the firm or corporate administrator.

The WSTC then transmits 88 the received postmark 41 (including the secure time stamp and any other associated data, such as, for example, a unique time-stamp identifier; the file signature; the file signature HASH; and a digital certificate) back to the demanding party 20 (FIG. 2A).

The demanding party 20 then optionally notifies 27a, 27b (FIG. 2A) the email recipient(s) 40, 40cc of the obtained time stamp; and additionally notifies 27C or 83 sender 130. As illustrated in FIG. 4, the notification email 27, in addition to containing the postmark 41, may optionally include other components, such as, for instance, informational, branding, or advertising components. For example, the notification email 27 may include a link to verify the time stamp 242, one or more logos 243 (such as the demanding party logo or branded front end logo and the USPS logo), a demanding party signature 244, marketing directed toward the encouragement of the viral spread of the service 245, the original email as an attachment or as a link 246, original attachment(s) as an attachment or as a link 247, and/or information on time-stamping 248. The components of the notification email 27 may be configured 258 by changing configuration settings available in the corporate administrative console 240 (FIG. 5).

In one aspect of the invention, the demanding party 20 may directly notify 83 the email sender of the receipt of the time stamp, without notification to the recipient 140 or the CC: recipient 140cc.

In another aspect of the invention, the demanding party 20 may attempt to verify receipt of the notification email 27 (either the notification email 27a to the recipient 140 or the notification email 27b to the CC: recipient 140cc) by delivery-apprising methods. For example, one or more of the following delivery-apprising methods may be used: establishing communication with the mail server associated with the recipient computing device 40 so as to attempt to use Delivery Status Notification (DSN) functionality; tracking the notification email 27 to determine a final delivery status by reviewing the exchange between MTAs; requesting a Mail User Agent (email client) "reading" notification; or if the receiving party's MTA supports the functionality, recognizing the MTA's delivery confirmation receipt. These delivery-apprising methods may be used in a complementary fashion.

Another means to verify the receipt of an email includes embedding a tracking graphic (such as a transparent gif or logo image) that is called when an email is opened while the reader is connected to the Internet. When the sent email is opened by the recipient connected to the Internet, the tracking graphic is downloaded and parameters such as an "email ID code" are sent to the server of the demanding party 20 thereby providing proof that the email was indeed opened in an MUA. It should be noted that even if the graphic has not been downloaded, it does not prove that the email has not been opened; this is because the user may not have been connected (or was having trouble) with the Internet at the time the email was opened, or the user's MUA may be configured not to download graphics by default.

Also, optionally, receipt of the notification email 27 may be verified by explicitly asking the recipient to follow a confirmation click-through link that the demanding party 20 includes in the notification email 27. The recipient can review the actual email by following the click-through link. The act of accessing the email would be proof of receipt and opening. The recipient can then choose to have the email sent to his regular email inbox. A further option is to send the originally sent email in the notification email 27, but to additionally provide a click-through link for confirmation. In either instance, the recipient could be encouraged to follow the click-through link through separate verbal or email messages from the sender, for instance saying, "I will continue to work with you only after you have confirmed receipt of the notification email 27 by following the click-through link provided."

Additionally and optionally, receipt of an email (or document) can be verified by the downloading of a file (time-stamped email or document) from the user/participant registry. When a participant downloads a file from the registry, the downloading is recorded, preferably in the registry itself. Thus, a participant can be sent an email (generally by the demanding party) with instructions on retrieving the file from the registry; whereupon, by logging into the registry, the participant retrieves the file, with positive confirmation of receipt. This functionality would preferably be enabled by the administrator via the administrative control panel.

If the notification email 27a, 27b is not deliverable 26a, 26b, that may indicate that the original email 25 may, also, not have been deliverable—for example, the allotted storage for email may have been reached or the email address is invalid, resulting in the original email and the email notification being undeliverable, or "bouncing." Thus, the demanding party 20 preferably positively informs 28 the sender 130 of the receipt of the notification email 27 or negatively informs 29 the sender of the non-receipt 26a, 26b of the notification email 27. Optionally, the positive receipt emails 28 and/or negative receipt emails 29 may be grouped and sent as a collection at the end of a time period, for example, at the end of a week; the advantage of the collection is a reduction in the number of emails received by the sender 130. As an additional option, the positive receipt emails 28 and/or negative receipt emails 29 may be addressed to the sender's delegated assistant or may be redundantly addressed to the sender and to the delegated assistant, as desired. These options could be set within the tools of the corporate administrative console 240 (FIG. 5).

A variety of other types of other calls (FIG. 11) and other conduit time-stamp input data can also be transmitted to the WSTC.

TCC:Addressing Schemes

Referring now to FIGS. 3A to 3E, various exemplary addressing schemes are presented to be used with the email parsing 35 function of the certified email system and method of the present invention. The addressing schemes allow determination of billing-associable details (for use with billing, cataloging, and content management) based on one or more of the following: (1) one or multiple IDENTIFIERS (IDENTIFIERS@TCCmail.com) coded in the local part (before the @ sign) of the demanding-party electronic-delivery address (TCC:Address); (2) email-transmission data derived from the "TO: Address," the "FROM: Address," the "CC: Address," the email header, sender's IP address, and/or transmission data; and/or (3) manual cataloging. Choosing the particular addressing scheme for use can be based on the level of security, the desire for automated billing and filing versus manual cataloging, learning curve considerations, and convenience of use.

The IDENTIFIERS may be derived from username and TCC:Address password authentication (to avoid spoofing) and/or codes for individual projects, clients, company name, and employee ID's or usernames, as required to obtain the billing-associable details for the particular desired detailed billing. In one aspect, simple and easy-to-use pass-through billing is enabled, such as is required by end users in certain types of businesses where the cost for services is billed to the user's client for a particular project, such as law or accounting firms.

After the user has established an account (or has had an account established for him) with the operator of the demanding server, the user is issued (or chooses) a username and account password. Preferably, for convenience of administration, the username is unique within the demanding server 20. For this reason, account username is typically the user's email address; a different username can be selected for identification in the TCC:Address, if necessary.

The billing-associable details may be determined by using one of the multiple presented email addressing schemes to determine the specific address to be used for the TCC:Address. Five exemplary addressing schemes are presented in FIGS. 3A to 3E, specified by way of example, and not by way of limitation. Significantly, the verbiage or codes used in the email prefix may be determined by the user in accordance with the user's own identification and cataloguing purposes. Thus, some users may not need or want to specify projects, clients or employees, some users may want to add a TCC: Address password, or users may choose to use numeric or alphanumeric IDENTIFIERS or purely alphabetic IDENTIFIERS, etc.

Significantly, also, the use of the "BCC: Address" field 32 for email 25 directed to the demanding server 20 is not mandatory, but may be employed to prevent identifying information from being conveyed to email recipients (such as client names, project names, and TCC:Address password). Where this is not a concern, another address field may be employed. Where it is a concern, the novel email certification system may, as an option, filter out the particular user's TCC:Address in the "BCC: Address" field 32 before time-stamping it to protect the confidential information contained in the TCC: Address. Optionally, if the end user desires an extra measure of security, with any of the addressing schemes not already including an address password, a TCC:Address password may be included in the TCC:Address. This TCC:Address password allows the demanding server 20 to verify the end user's identity, before the solicitation to obtain a time stamp by receipt of the email (addressed to the TCC:Address) and before authorizing the demanding server to charge the time stamp to the end user's account is carried out. Optionally, if a TCC:Address password is inadvertently typed into the "CC: Address" and so becomes known, the demanding server 20 can send an email to notify the sender 130, who may choose to change his address password by logging into his web-based account with his account user name and account password.

Further, in some situations it may be desirable to include the TCC:Address in the "CC: Address" field or "TO: Address" field, even though billing is based on the TCC: Address (which is usually entered into the "BCC: Address" field). For example, this might be desirable in the situation in which the sender 130 wants the recipient(s) 140 to include the sender's TCC:Address in correspondence, such as by using "Reply to All," so that the full email exchange is certified by the email certification system of the present invention.

To facilitate this certification of a full email exchange, optional subsidized certified reply functionality can be provided. The subsidized certified reply enables the sender 130 to allow the recipient 140 to send a certified response that is billed to the sender 130; thus the email sender incurs the charge for the response-email time stamp obtained for the email reply of the recipient(s). An offer allowing the recipient(s) 40 (and, optionally, CC: recipient(s) 40cc) to reply using this subsidized certified reply option can be extended 249 (FIG. 4) in the certified email notification 27. This is allowable even if the recipient 140 is not a registered user of the certified email system, or if the recipient 140 is registered with a different demanding server 20 than the sender 130, or even if the recipient 140 is registered with the same demanding server 20. This subsidized certified reply option would preferably not be a default option, but would be configurable via the configuration settings in the corporate administrative console 240 (FIG. 5) as one of the user and participant privileges and/or parameters 252.

A simplified way to subsidize response-email time stamps is to create a TCC:Address prefix that is only good for a few response-email time stamps and insert this address on the CC:Address line of the email. By asking the recipient to "reply to all," a new user would in essence be time-stamping his or her response and utilizing one of the limited-quantity response-email time stamps associated with the temporary TCC:Address prefix.

Referring to FIG. 3A, the first example of an email addressing scheme is the name value pair addressing scheme. In this example, the full TCC:Address is exemplified by Proj158.Clnt103.PW001.Emp001.Firm123@TCCmail.com (301). The first entity is "Firm123," in which the firm name is associated with the value of 123 to identify the firm. Similarly, the employee (or Username) is identified as employee 002, the TCC:Address password is identified as 001, the client is identified as client 103, and the project is identified as project 158. The particular example shown is only one option. For example, P158.C103.W001.E001.F123@TCCmail.com is associable to identical values. Note that codes do not have to be numeric and field names do not have to be as presented; conformity standard will be dictated by the market, language, personal preferences, etc.

The advantage to coding the email address with name value pairs such as these is that a user can easily become familiar with the mechanism and thereby immediately recognize if a TCC:Address email address is correct and be able to generate such codes himself. An additional advantage is that provision is made to specify a wide range of billing-associable details for the particular detailed billing desired, so maximum flexibility is achieved. Although the delimiter is presented herein as ".", other delimiters are usable and are within the scope of the invention. Further and optionally, if the width of the entities is set, no delimiter would be required.

However, in order to ensure correct parsing of fields irrespective of their order, the name value pair scheme presented results in a long address, which may not be desirable to all users, such as users of popular mobile computing devices with small keyboards or users with difficulty typing. Fixing the order would only allow for a slightly shorter prefix. Most email clients provide some form of "auto-discovery" of recently used email addresses, therefore once a TCC:Address prefix has been used even once, there is good chance it will be auto-discovered and auto-completed when the user starts to type it.

FIG. 3B illustrates a second email addressing scheme method, a derived addressing scheme, whereby the TCC: Address is simplified, using only the project name as an IDENTIFIER—with the other values derived from email-transmission data or manual cataloging. The example given in FIG. 3B is Proj158@TCCmail.com (310).

If usernames can be uniquely distributed across the demanding server 20, then Firm 311 can be removed as a parameter. Then, Username 312 (employee name) can be removed if the "TO: Address" or the "FROM: Address" can be accepted as, or associated with, the Username. If reasonable security is acceptable, TCC:Address password 313 can be removed as a parameter if the IP(s) in the user's identity profile is consistent with the IP(s) of his mail server(s) and/or the IP(s) of his device 30. (Optionally, the TCC:Address password can be appended to the end of Proj158, as in Project158.PW313@TCCmail.com; thus shortening and simplifying the TCC:Address, yet providing an extra measure of security.) Optionally, Client 314 can be removed if Project 315 is unique to the Firm and if manual association or registration is set up using the administration tools accessed by the firm or corporate administrative console 240.

Using the derived addressing scheme of addressing, by default, the certification of the received email 25 would not be initiated unless the firm, username (employee), TCC:Address password, and client could be derived or removed as a required parameter. If an email 25 is received in which the parameters cannot be derived or removed, a return email to the sender expressing the problem can be sent. Alternatively, if so configured for the user, the TCC:Address prefix can be used to dynamically create a new client (folder) and/or project if they do not already exist. New client folders and/or projects can be in a pending state awaiting acceptance (which would be desirable in case the user made an error entering the TCC: Address prefix); emails in a pending project may be moved to another project.

If the sender 130 desires to allow a subsidized certified reply offer to be extended, this can be enabled 252 (FIG. 5) in the corporate administrative console 240, as preferably the default is to not allow subsidized recipient certified replies. Preferably at least one of the addresses in the "TO: Address" field or the "CC: Address" field would be registered to allow association of the subsidized certified reply with the user's account. Otherwise, the subsidized certified reply would not be processed unless the recipient 140 was also registered to use the certified email system. Optionally, as described above, limited-quantity response-email time stamps associated with the temporary TCC:Address prefix could be provided.

Figure 3C:
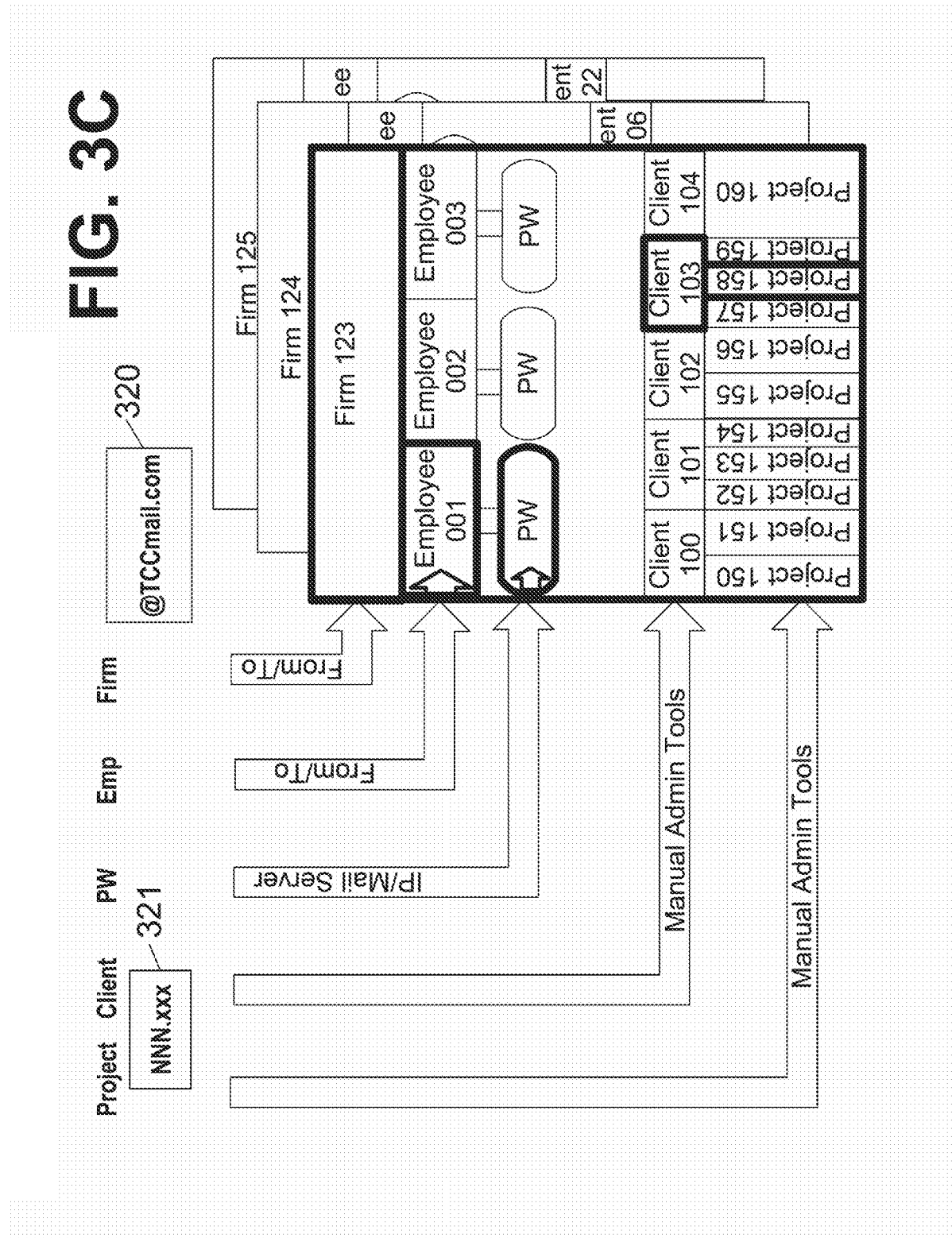

FIG. 3C illustrates a third email addressing scheme, an ad-hoc addressing scheme, whereby the TCC:Address is simplified. The end user can freely enter any numerical or alphabetical text he desires, without having to register the ad-hoc IDENTIFIER of the TCC:Address in advance. (For example, a sender 130 can use his client name "IBM" and create a specific ad-hoc TCC:Address, such as "peterIBM3@TCCMail.com," without having to register the address, the client, or the project in advance.) Then, at a later point in time, the user or a delegated assistant may log on to use the manual administrative tools 48 (FIG. 2A, FIG. 5) to associate the ad-hoc address with a client and project. Preferably, the text of TCC:Address 321 may indicate or suggest the client and/or project, for efficiency in cataloging. With or without meaningful text, the end user or an assistant should be able to easily determine the correct cataloguing based on sender, recipient(s), and content. Optionally, a TCC:Address password can be included in the ad-hoc TCC:Address.

Figure 3D:
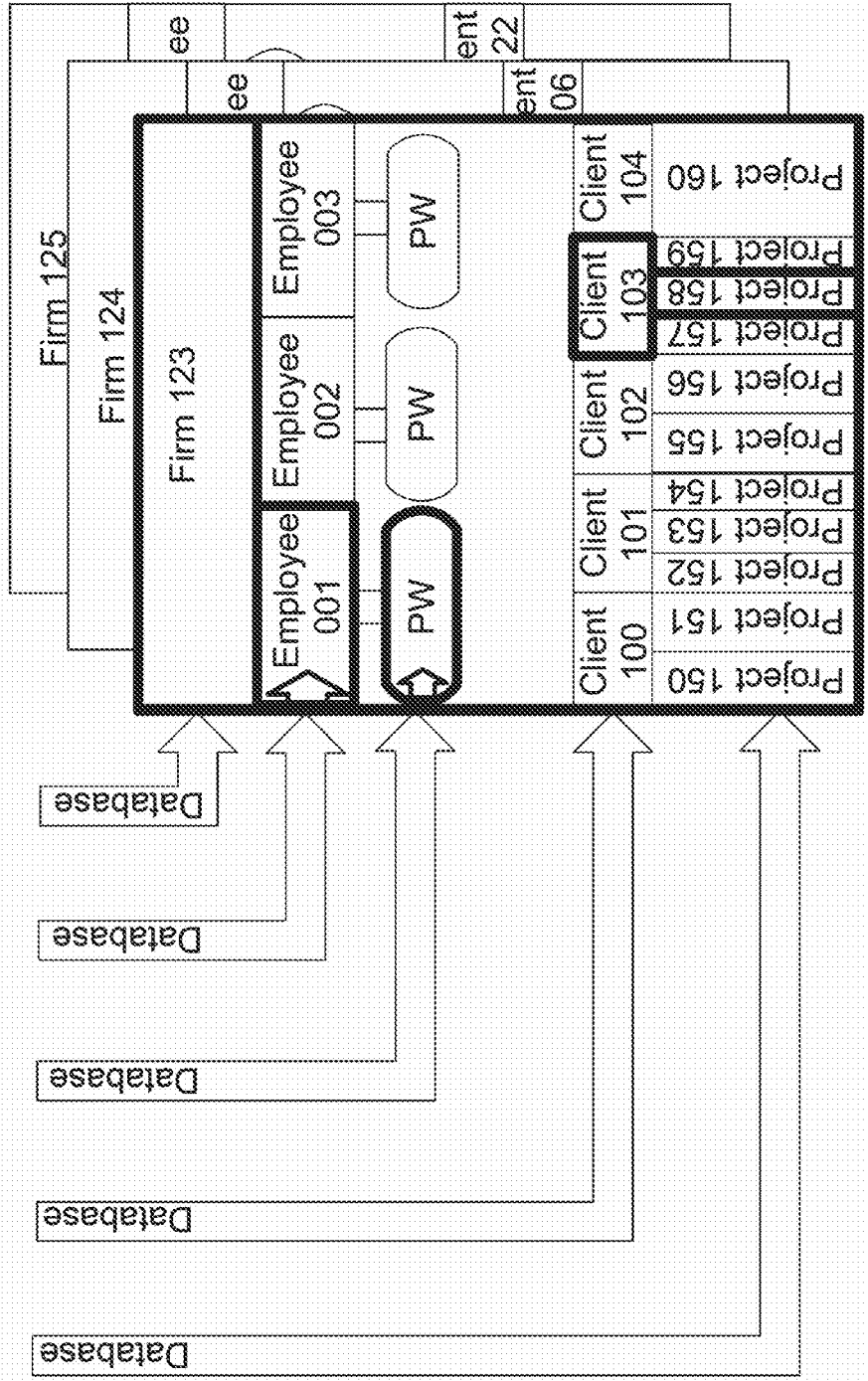

FIG. 3D illustrates a fourth email addressing scheme, a pseudo-random addressing scheme, whereby the pseudo-random IDENTIFIER in the local part of the sender's specific TCC:Address is a pseudo-random unique alpha-numeric code. The example of a pseudo-random TCC:Address given in FIG. 3D is R4ND6M@TCCmail.com (330).

The administration tools accessible in the user/participant console 260 (FIG. 6) allows generation 237 and display of a unique alpha-numeric code for the sender's use (one unique pseudo-random IDENTIFIER would preferably be associated with each project). Depending on the limitations on users (email address, IP address, etc.) set up by the company's administrator, this code can be made as short as 4 or 5 characters and not compromise security (e.g., 29fds@TCCmail.com). Without limitations on users, the code needs to be longer (e.g., 29fds2swdf@TCCmail.com) to be able to distinguish it across the demanding party 20 (and their firms or companies) and to avoid accidental or fraudulent access attempts. When the demanding party 20 receives an email to this address, it uses the pseudo-random IDENTIFIER prefix as a key to look up the required fields. The code is preferably generated such that it never includes vowels, ensuring no derogatory terms are spelled in the pseudo random code and no confusion occurs between letters I, O and the numbers 1, 0. Optionally, the company administrator can have the pseudo-random IDENTIFIER code sent to an end user via email using the tools of the corporate administrative console 240 or the end user can access the code via the code generation tool 237 of the user/participant console 260. Optionally, a TCC:Address password can be included in the pseudo-random TCC:Address.

FIG. 3E illustrates a fifth email addressing scheme, a simple corporate addressing scheme, whereby the TCC:Address is simplified, using only a company-associable IDENTIFIER value. The example given in FIG. 3E is FIRM123@TCCmail.com (340).

The simple corporate addressing scheme allows for a single, easy-to-remember user-specific TCC:Address, for example, firm123@TCCmail.com, where "firm123" is a well accepted abbreviation of the firm's name. Unlike the ad-hoc solution discussed above, the TCC:Address does not change to identify different projects or clients. On the other hand, like the ad-hoc solution, this would require manual cataloging 48 (FIG. 2A, FIG. 5) using the corporate administrative console 240 tools to identify the project or client using the addresses and content of the email. In addition to placing the email 25 in the right project registry, identifying and cataloguing using the administration tool provides a means to allocate billing charges to the right client project (if necessary). Optionally, a TCC:Address password can be included in the simple corporate addressing scheme TCC:Address.

Content Management

In another aspect of the current invention, a convenient, user-friendly, multi-party archiving and content management system is integrated with signing and time-stamping functions to provide confirmation of data integrity. Teams or groups of participants are provided with a centralized location to access, search, sort, review, time-stamp, and collaborate on project documents, registry entries, notes, time-stamped emails, and other time-stamped documents. The participant tools are accessible via the user/participant console 260 of FIG. 6.

Projects may be created by end users 268 (FIG. 6) or created by corporate administrators 230 (FIG. 5). In order to ensure a team makeup consistent with the desires of the company, in addition to the creator, a company administrator has the ability to add or remove participants from a project. The registry will clearly indicate the change and who made it. Preferably once added as a participant to a project, the user maintains access to the full history of the project until the moment he is removed as a participant; alternatively, partial access may be provided to the participant based on the particular desires of the user and/or company administrator.

Corporate Administrative Console Tools

FIG. 5 presents the user-friendly tools and configuration settings of the corporate administrative console 240, which are available to the corporate administrator (who may or may not also be an end user). The certified email system of the present invention is configured with appropriate functionality to provide the tools for use by the corporate administrator, in his administrative capacity. Additionally, a corporate administrator may be a user or participant in one or more projects, and, as such, may additionally access and use the tools available in the user/participant console 260 of FIG. 6.

The corporate administrator can create 250 one or multiple user accounts, either manually or through automated means, such as by uploading a comma separated value (CSV) file. An email invitation can be sent, automatically or manually, to newly created users. Employees can be added with employee-specific information, such as an email address, employee ID, etc. The administrator can authorize 251 participants, such as, for example, clients, associates, or advocates, with invitation emails optionally automatically or manually sent. (Optionally, users can be authorized to add participants who are automatically accepted.) The administrator can set 252 user and participant privileges and parameters.

If using the pseudo-random addressing scheme, the administrator can generate 253 the unique alpha-numeric code(s) needed. Also, the processed time stamps not already associated by other means with valid clients and projects can be manually associated 48.

The default TSA(s) and value added service(s) can be chosen and configured 255, with further options for setting redundancy. The registry logs can be accessed 256 and the user/credit table can be viewed 257. Also available are options (detailed in FIG. 4) for customizing and configuring 258 the generated time-stamp receipt.

Individual folders for particular projects can be created 230 and managed, with access given to appropriate clients, lawyers and other participants. Also, preferably included in the project folder functions 230 is a "project history" report feature, whereby, upon request, the corporate administrator is presented with a (preferably searchable) list of all projects associated with his users under management. The report may present any or all of the following: project name; creation date; number of active participants; number removed; number of registry entries; credits used to date; credits used last month (or bi-monthly); and current credits used. Selecting a project name will preferably bring up its registry. Selecting the participants will bring up a list of participants. Selecting credits used will bring up a summary of credit use by user for this project. An alternate drill down link provides complete accounting of all the credits used that includes: user, date, product, and credits. Additionally, from the "project history" the administrator can inactivate a project, or reactivate an inactive project.

Time-stamp (TS) and other service or product usage reports can be created and/or viewed 231, and can also be downloaded and/or exported 232. Blocks of credits can be managed and purchased 234; also, if provision is made with the operator of the demanding party 20 corporate account holders may be issued financial credit to be applied against usage.

A payment scheme (FIG. 10) may be selected 233. If blocks of credits are to be bought 234 under the payment scheme selected, then they may be distributed among the users under the administrator, either equally, manually, or as needed, as desired by the administrator.

The corporate administrator may also manage 228 digital certificates for signatures, authentication, and encryption and decryption. This is in support of optional functionality and is not generally needed.

In the uncommon case that a customer needs to verify 229 his time-stamp with the third-party TSA 90 for legal reasons, the demanding party 20 is configured to allow this verification, using the file that is archived with the demanding party 20. For example, verification with USPS can be provided for the 7-year lifecycle of the EPM® from the USPS.

Most of the links in the corporate administrative console 240 can be expanded to show details or to access further functionality. Further, preferably included are both tools allowing specific date ranges to be studied and tools that display historical purchases and usage patterns in a graph.

User/Participant Console Tools

FIG. 6 illustrates the convenient tools and configuration settings provided for users and for participants, which are accessible by logging into the web-based user/participant console 260. The user can change 261 profile settings and information, such as the account password, TCC:Address password, address, phone, email, etc. The registry logs can be accessed 262, searched, sorted, and reviewed 263. Time-stamped files (and other files) can be searched 264 (see Simple Search Capability below) or downloaded 265. Likewise data from the postmark 92 including the obtained time stamp can be downloaded 266. To facilitate communication between participants, notes can be manually added 267 to projects and to folders. The user can also set up 268 projects/project folders and manipulate projects/project folders he has previously set up, as well as moving time-stamped files and notes into the projects/project folders. As an optional function, files can be directly uploaded 269 (and optionally time-stamped or merely used for reference).

If allowed by the administrator, for certain circumstances (such as for an end user who wants to do some additional personal time stamps or who is not part of a firm) an alternative personal payment scheme can be selected and prioritized 235. The user can select and/or manage 237 TCC:Addressing Schemes, including generating a pseudo-random IDENTIFIER of the Pseudo-Random TCC:Address Scheme, if desired. The user or participant can also verify time stamps 238.

It is possible for a sender 130 to never have to directly visit the corporate administrative console 240 or the user/participant console 260, because he is merely using the TCC:Address email interface. However, such senders, their administrator, their customers, or their participants may find utility in accessing more tools in the user and/or administrator consoles. Indeed, it may be necessary in order to arrange payment. Also provided is the option to allow users or participants to review historic activities organized in a registry using their web browser.

The console (user/participant console 260) accessible to a user (such as a company employee) is the same type of console (user/participant console 260) accessible to a participant (such as, for example, opposing counsel). However, optionally, an administrator may choose to reduce some privileges for participants, such as setting some filters for registry log 270 access.

Registry Logs, Including Notes

The certified email system stores a variety of account information and time-stamp data with other project-correlated data in user-accessible registry (or repository) logs 270, as illustrated in FIG. 7. Exemplary viewable registry logs (most of which are viewable and/or downloadable) include user account information 271; client time-stamped email usage (TCC:Address) 272; employee (user) and participant time-stamp usage (TCC:Address plus website-based uploads) 273; participant's usage of files and emails (web-based) 274; employee (user) and participant usage of files and emails (web-based) 275; participant's user notes 276, employee user notes 277; time stamps with emails and attachments 278; time stamps with web uploaded files 279; optional ability to view purchase records 221; time-stamp of the "registry logs to date" 222 (time-stamping the text content of the registry entries to the current date, such as the notes and systems messages); actions of administrator such as changing settings or adding or managing accounts 223; emails, attachments, and/or web uploaded files without time stamps 224; project creation and manipulation 225 (including creating and renaming projects and/or folders); and system entries and/or notifications 226 (such as, for example, time-stamp errors or delays).

Demanding Party Components

Referring now to FIG. 8, more details about the architecture and optional components of the demanding party 20 are presented. As illustrated, a demanding party 20 may comprise a web exchange platform (WXP) 84(a, b); an affiliate presentation that includes web access, herein referred to as a trusted affiliate presentation (TAP) 85(a, b, c), and an email front end (EFE) 70(a, b, c). Additionally, a web site 77 allowing web-based administration and multi-party archiving and content management (integrated with signing and time-stamping functions) may be run by the demanding party 20.

The email front end 70 receives emails 25, parses 35 (FIG. 2A) the contents, and makes the appropriate calls to the web exchange platform 84.

The web exchange platform 84 receives calls from the email front end 70, prepares the time-stamp event, calls 241 the WSTC 50, transmits 87 the conduit-input data and call, files the request 43 (FIG. 2A) and postmark receipt 41 (FIG. 2B, FIG. 9), and provides a web presentation interface to users 30. The web exchange platform 84 also preferably presents to the user a web site 77, allowing access to the corporate administrative console 240 (FIG. 5) and to the user/participant console 260 (FIG. 6), as well as uploading of files 76 for time-stamping 279 (FIG. 7) or for registry storage 224.

The Trusted Affiliate Presentation (TAP) 85 is a branded consumer-facing front end of a web exchange platform 84. The TAP 85 may (or may not) be administered by an organization other than that running the web exchange platform 84. Specifically enabled in the TAP 85 are administrative functions, such as, for example, centralized purchasing and sharing of credits as well as client/project usage distribution reports with the option to export to in-house billing systems. A TAP 85 may meet the market need for recognizable, respected branding.

Other architectural configurations are also provided. For example, without departing from the present invention, the demanding party 20 may comprise an integration of the TAP 85 and the email front end 70 into a single component; or the demanding party 20 may comprise a single TAP 85 having the functionality of the email front end 70 and the web exchange platform 84; or, although discussed separately, the demanding party 20 and the WSTC 50 may be combined into a single architectural element.

Optionally, the WSTC 50 may be accessed directly (usually through its secure web services API) by customers who do not need the functionality of the demanding party 20.

The web exchange platform 84 is customizable to meet the requirements of its operator. The web exchange platform 84 may also be accessed through its secure web services API by customers who would like to integrate their systems and automate their processes.

Verification Utilities

Figure 9:
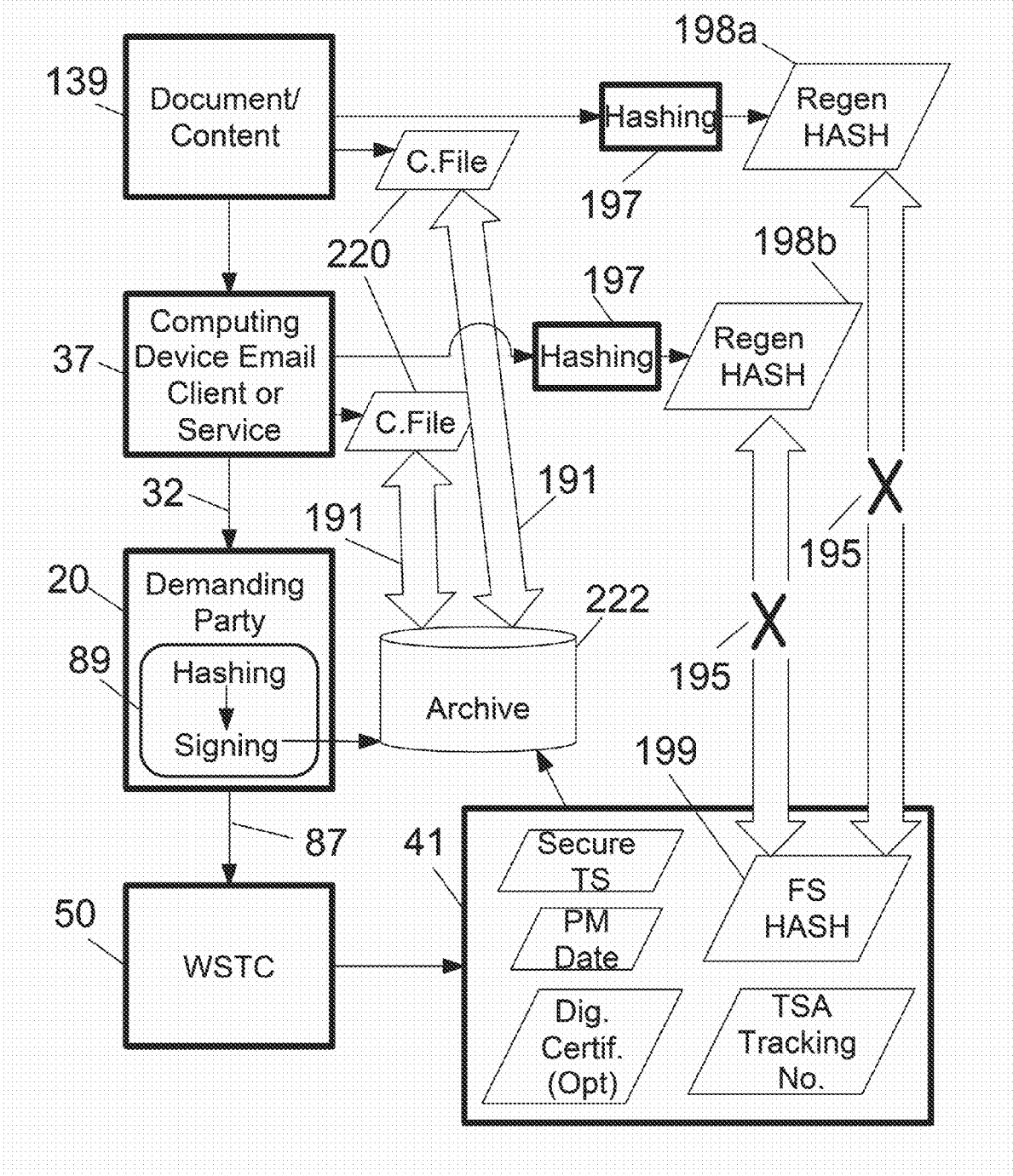
FIG. 9 presents a schematic of HASH verification problems solved by the certified email system and method of the present invention.

Referring now to FIG. 9, a further aspect of the present invention provides two convenient web-based automated verification utilities 150 (FIG. 1). These two verification utilities 150 are in addition to, and complementary to, the time stamp verification provided in the user/participant console 238 (FIG. 6) and in the corporate administrative console 229 (FIG. 5). These two web-based automated verification utilities 150 provide functionality to compare and to attempt to verify a challenge file 220 (which may be a file or an email with any attachments that is believed to be previously time stamped) with a time stamp, whether or not the challenge file originated from interaction with the demanding party 20. The two easy-to-use verification utilities comprise a Content-Proof Verifying Tool and a Verify HASH Tool. Although the verification utilities 150 can independently verify challenge files, some verification methods rely on information in one or more archives 222, such as the database(s) 66 of the demanding party 20 or database(s) 103 of the WSTC 50 or other postmarking or time-stamping archives.

The Content-Proof Verifying Tool conveniently verifies particular email elements (such as the content or the attachments) of the challenge file. The Verify HASH Tool conveniently verifies whether a time-stamp receipt is valid for a given challenge file. Optionally, the verification tool 150 can additionally be configured to do digital signing, digital signing verification, encryption, decryption and hashing.

The registry entry for a time stamp 278, 279 (FIG. 7) can be expanded to view details such as postmark receipt data including the File Signature HASH 199 (FIG. 9) of the email (or file), the File HASH (71 (FIG. 2A) or 96 [FIG. 2B]) of the email (or file), the postmark date, and the time stamp authority tracking number. Also accessible via links are the file signature and TSA signed time stamp contained in the postmark 41 (FIG. 2B). This same information may be sent in the notification receipt 27 (FIG. 1) to the email recipient and/or sent in the informing email announcement 29 (or 28) to the sender 130 (informing him of the completion of the time stamp and possibly the receipt of the notification email 27) and/or uploaded to the registry 270 (FIG. 7) and viewable in the registry log 262 display of the User Console 260 (FIG. 6).

The postmark 41 receipt data from the TSA is sufficient to confirm the time stamp's validity without further third-party involvement; a detailed description of this process is preferably available upon request and may be included on the demanding party's FAQ. Unfortunately, the process is not easy for the average user to execute.

In addition, when using email files, the process may not work. The original email cannot be used for direct HASH comparison, although the end user may not appreciate this fact. The sender 130 may have an email he created as a text document 139, such as in Microsoft Word®, then sent with his computing device's email client or service 37 and now is found in the "sent folder" of his email client 37. But if a hashing 197 algorithm is used to produce a regenerated HASH value 198 (either from the email client 37 "sent folder" or from the original content 139) this regenerated HASH value 198 will not match the File Hash that was signed by the demanding party 20 (using its hashing and signing engine 89, FIG. 2A) and used by the TSA 90 to generate the File Signature HASH 199 of the email 25 (although the textual content is identical), due to the changes to the email header information during transport; therefore, the regenerated HASH value 198 of the email in the "sent folder" of the email client 37 will not match the File HASH (the HASH produced by, and preferably signed by, the demanding party 20 and then sent to the WSTC 50 and on to the TSA 90) of the email received by the demanding party 20 or the File HASH (using the same algorithm 197) of the email received by the recipient 40. As such, the File Signature HASH 199 generated by the TSA 90 will not correspond 195 to either regenerated HASH 198a, 198b.

The Content-Proof Verifying Utility will provide users with the ability to verify the content 139 of a file or email with its attachments after it was sent. (This functionality is separate from, and in addition to, the verification described above in block 229 of FIG. 5, which provides verification of the end user's time stamp with the file that is stored on the demanding party server.)

A user presents a challenge file 220 to the Content-Proof Verifying Utility. The Content-Proof Verifying Utility will allow a user to drag and drop a sent email (purportedly a previously-time-stamped email) from his "sent items" directory of email client 37 or document content 139 accessible to the user's computing device into an indicated area in an operable drag-and-drop utility (a "bucket") on the Content-Proof Verifying Utility. Alternatively, the user can browse for a file and upload said file via an upload utility, or, optionally, an end user may even paste the file contents into a prompt. In yet a further alternative, a user may forward a verification-request email requesting verification to the trusted carbon copy provider, e.g., verify@tccmail.com established for the purpose of providing this utility, with the result being emailed to the requester's "reply" email address.

In an effort to make the verification very simple, the Content-Proof Verifying Utility will provide a feature that will compare files and provide a positive content verification ("Content Verification Passed") or negative content verification ("Content Verification Failed") response to the user. Substantially, the Content-Proof Verifying Utility will compare the file provided with a copy of the file that is stored in archive 222, such as on the demanding party servers. The inconsistencies that may exist between a file stored on a user computing device and the time-stamped copy on the demanding party servers will, if from the same source, consist of email header information; thus the Content-Proof Verifying Utility will not decline a positive verification if the content alone is identical.

To demonstrate that the File Signature HASH 199 of the email file received by the demanding party 20 corresponds to the regenerated HASH value 198 (of the "sent items" email file 37 of the sender, of the regenerated HASH value 198 of the "inbox" email file of the recipient, or of the content 139 of the sent email stored elsewhere on the user's computer) the Content-Proof Verifying Utility proves the content of the document, file, "sent items" email, or "inbox" email is contained in the time-stamped email and that no additional content exists therein and that content is not missing (thus meaning that the content has not been changed). Submitting the challenge file (document, content, "sent items" email, or "inbox" email) to the Content-Proof Verifying Utility results in the files being compared 191 and the exact differences between the time-stamped file and the challenge file delineated. The content-verification result is preferably one of the following forms: "complete match," "body and attachments match," "body only match," "attachment only match," or "no match." Details may be presented if the user selects "details." In the case of the body and header, the details will present the specific content that has been added to or is missing from the submitted challenge file. To ensure credibility, the time stamp of the original file is verified.

An additional option to assist end users in verification is to provide a copy of the actual file that was time-stamped which, by definition, would have a matching HASH. This could be provided, preferably through a link or as an email attachment, in the notification email 27 to the recipient and/or the informing email announcement 28, 29 to the sender 130. Also, the registry provides access to a copy of the email file (block 278, FIG. 7) that was time-stamped and by definition could be hashed to produce the matching HASH. This HASH would correspond with (but not match) the File Signature HASH 199.

The Verify HASH Tool is a potentially independent service option that automates the verification process whereby anybody can verify whether a time-stamp receipt is valid for a given file or email and its attachments.

In one application, a user would have the ability to verify if the regenerated HASH value 198 of a file matches the one contained in the file signature corresponding to a valid time-stamped receipt, the stored File HASH generated using the hashing algorithm 71 (FIG. 2a, FIG. 9), that may potentially be stored on the demanding party server archives 66. This need might arise if the File HASH of a file has been lost or disassociated from the file. The user can login to his account on the demanding party 20 and drag and drop a file into the Verify HASH Tool "bucket" or browse for the file. The resulting regenerated HASH value 198 can be presented, and the demanding party's database archives 66 can be searched for any matches among stored File HASH Values. (For privacy reasons this search may be limited to the customer's time stamps). Alternatively, the File HASH may be provided directly; the File HASH can come from any source including earlier storage and publicly available tools applied to a file. If a match is found, the corresponding stored time-stamp receipt is validated. This is an absolute verification of the digital signature and time-stamp information; thus, the "Content Verification Passed" return would only be provided if the file comparison is 100% identical. If a matching stored File HASH belonging to the user is not found on the demanding party's servers, then the user can (if the service is enabled) optionally submit a time-stamp receipt obtained through any means to test against. The Verify HASH Tool can be configured to accept time-stamp receipts of other providers. As the Verify HASH Tool can perform hashes of any file, optionally, a single file or multiple files can be submitted and their HASHs compared.

Therefore, the present invention provides web-based straightforward verification utilities 150 that automate the verification process. With these verification tools 150, end users can easily verify whether a time-stamp receipt is valid for a given file (if the time stamp was originally received from the demanding party 20 or even if the time stamp was received from a third-party provider). A single destination for independent Public Key Infrastructure (PKI) verification is highly advantageous to the average end user.

Simple Search Capability

The Simple Search Capability will provide users with the ability to do simple keyword searches inside of the user/participant console 260 (FIG. 6) registry. The Simple Search Capability will at least provide users with a list of all entries that include the keyword that has been searched. Other enhanced search engine capabilities can optionally be provided, such as filters and a variety of styles of search query syntax and ranking results from Probabilistic, Boolean or other search logic.

From within the registry, users may wish to search as they do from within an application such as Microsoft Outlook®. They can search the current open project, the current open folder, the current open folder and subfolders, all folders, and/or a selection of folders. The results of a project search would be preferably presented by highlighting (or filtering to) compliant entries in the registry. Matching text itself is preferably further highlighted.

The folder tree address, along with a section of the line of text that contains the searched-for text, is preferably provided as a search result. Clicking on the folder tree address opens that project and presents the result as if the project was searched for the text. Preferably forward and backward navigation is provided.

Further advanced search options, allowing for expansion or restriction of search criteria, are optionally provided. For example, the Simple Search Capability of the present invention can be configured to search based on any or all of the following: include (attachment or uploaded) file types whose content may searched; limit the date range; exclude registry notes; restrict registry entries to selected types; search only folder names; restrict registry entries to specific participant(s) or system; display first found, only most recent or oldest entry; included in email body content; included in specific email field ("TO: Address," "FROM: Address," subject field, etc.).

With more elaborate search capabilities, a more sophisticated search engine, indexing, ranking and storage solution are provided.

Further, all the reporting tools support advanced search such that all fields may be filtered using wildcard notation or ranges (as is appropriate with dates for example). A search result may be refined to narrow a result set further, may be sorted by any field (ascending or descending), and may be exported to a CSV file.

Firm or Corporate Purchase Methods

Figure 10:
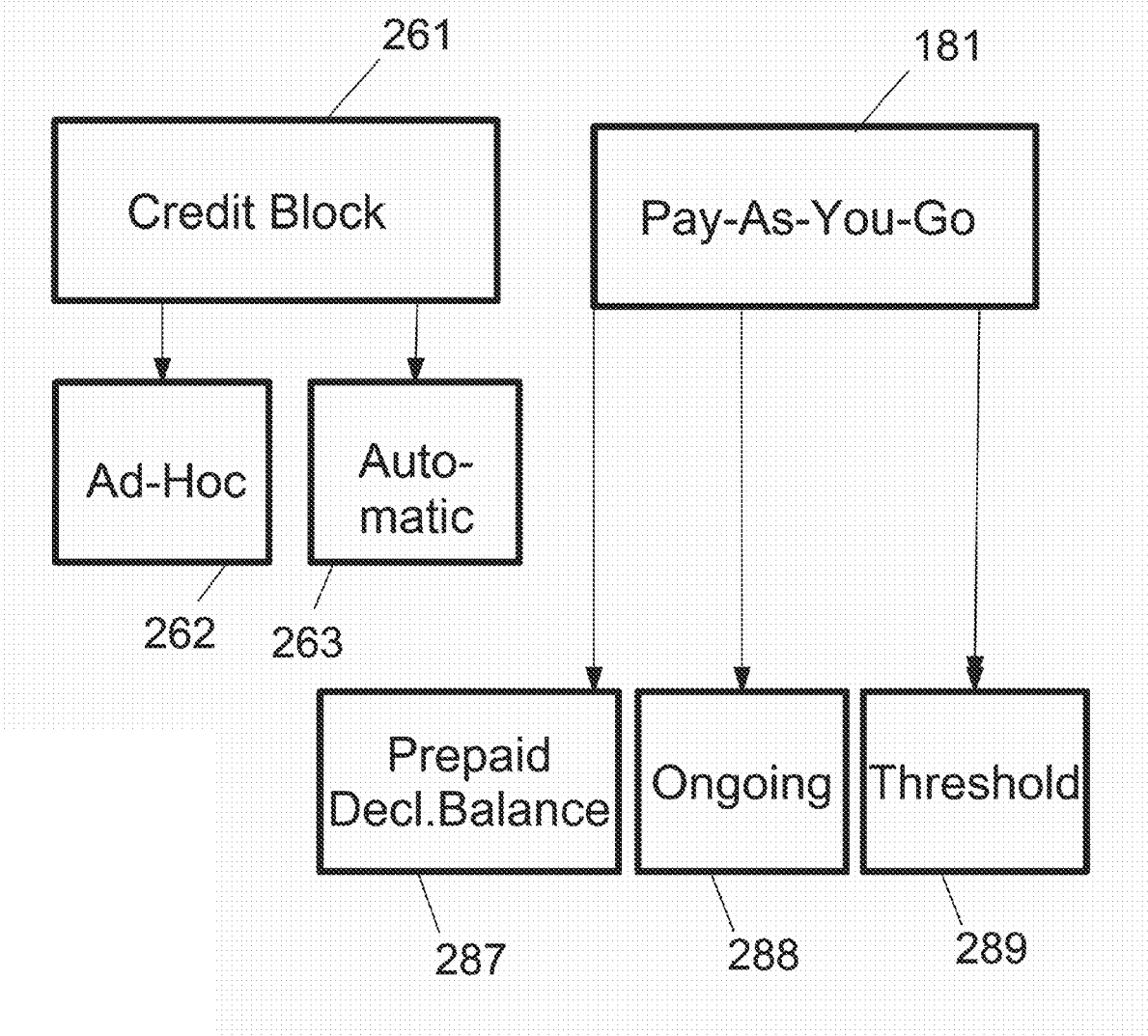
FIG. 10 presents a schematic of time-stamp credit purchase methods of the certified email system and method of the present invention.

Referring now to FIG. 10, from within the corporate administrative console 240 (FIG. 5) the corporate administrator may select from available payment schemes or methods 233 (FIG. 5) that are offered by the demanding party 20. A first exemplary purchase method is the credit block purchase method 261 and a second exemplary purchase method is the pay-as-you-go purchase method 181. Each method has advantages.

When using either method a firm or company will decide whether it will purchase credits on behalf of its employee accounts or if employees will be responsible for purchasing credits for themselves.

In the credit block purchase method 261, a quantity of credits (generally having an expiration date) are purchased 234 (FIG. 5) in a block, with the associated price per credit based on the quantity purchased; a larger purchase can result in a lower price per credit (either credits for time stamps or for other providing party services).

The pay-as-you-go purchase method 181 comprises three types of purchase plans: an individual ongoing purchase plan 288, a prepaid declining balance purchase plan 287, and a threshold 289 purchase plan. In the pay-as-you-go purchase method 181, preferably a credit card is kept on file. Optionally, but less preferably, the company or customer using the pay-as-you-go payment method could be invoiced.

In the individual ongoing purchase plan 288, each credit is potentially charged as the time stamp is used. The individual ongoing 288 charging system would generate numerous small charges, which might not be desirable for some companies or customers.

A pay-as-you-go threshold 289 purchase option allows for charging when a threshold of credits is reached (in the special ongoing 288 case the threshold of credits is 1). Thus, the numerous small charges associated with the individual ongoing purchase plan 288 are effectively consolidated and charged when the threshold is reached. If the threshold is not met in a certain amount of time (for example, monthly), the account is then automatically charged the current balance. The down-side for the demanding party is that it will have to predict credit usage (it may have to advance purchase from TSAs 90 and PPs 299) and will have to advance credits to the company using the service (e.g., give financial credit to the companies).

A prepaid, declining balance system 287 could be used, wherein the company pays an initial prepayment and the balance declines until a threshold is reached, at which point the company's credit card is automatically charged another prepayment. The prepaid, declining balance system has an advantage to the demanding party in that no advance of credits to the company using the service is required (e.g., no financial credit to the company is required).

The pay-as-you-go purchase method 181 provides convenience, negating the need for credit distribution and greatly reducing the credit management overhead, yet potentially results in higher costs, plus the demanding party must manage expiring or rejected credit cards.

The credit block purchase method 261 provides the company or customer the possible option of a lower cost per time-stamp credit, with the risk of credit expiration and wastage and potentially with a management overhead to distribute the credits.

The credit block purchase method 261 is presented in two alternatives, the ad-hoc credit block purchase method 262 and the automatic credit block purchase method 263. In both, the firm's administrator preferably has the option to distribute 234 (FIG. 5) credits to his end users or to allow them to draw from a company pool. The pool provides ease of management, but reduced control. Preferably there is a "distribute all" button that may intelligently allocate the administrator's balance to users based on recent usage patterns and individual balances. Optionally the "distribute all" button may allocate credits equally or following an administrator-designated scheme.

While generally the credits are used on a soonest-to-expire basis, preferably there is a customizable prioritization of credit usage, most preferably allowing the end user to choose between using only credits in a corporate pool, using only credits self-purchased, preferentially using credits in the corporate pool before self-purchase, preferentially using self-purchased credits before corporate pool credits, and preferentially using first-to-expire. This may be set on a project-by-project basis.

The ad-hoc credit block purchase method 262 is a standard process in which, when logged into the corporate administrative console 240 (FIG. 5), the administrator selects a quantity of credits to purchase (with an associated price per credit displayed in the discount schedule); then he proceeds with an e-commerce checkout 234 (FIG. 5). Payment is typically by credit card; however, for large volume where a credit arrangement has been made, the corporation may request to be invoiced.

In the automatic credit block purchase method 263 (FIG. 10) the administrator will establish the guidelines for automatic purchasing of credits when inventory becomes low and for the number of credits for which the automated purchase is to be made.

With both the ad-hoc credit block purchase method 262 and the automatic credit block purchase method 263, notification alerts (with different levels of criticality) can be set for a balance threshold, for unusually high activity, for credit card denial, for credit card receipts, etc. Yet it remains the responsibility of the administrator to manually monitor the credit balance for his firm.

Preferably, using the firm or company purchase history, usage patterns, current status, and interrelationships between various products, an algorithm similar to EOQ (Economic Order Quantity) algorithms can be used to recommend credit volumes to purchase and to potentially make the purchase automatically.

Billing reports, a consolidated report of credits and their cost used by project for the period indicated, can be generated, irrespective of payment method.

WSTC Application Programming Interface

Figure 11:
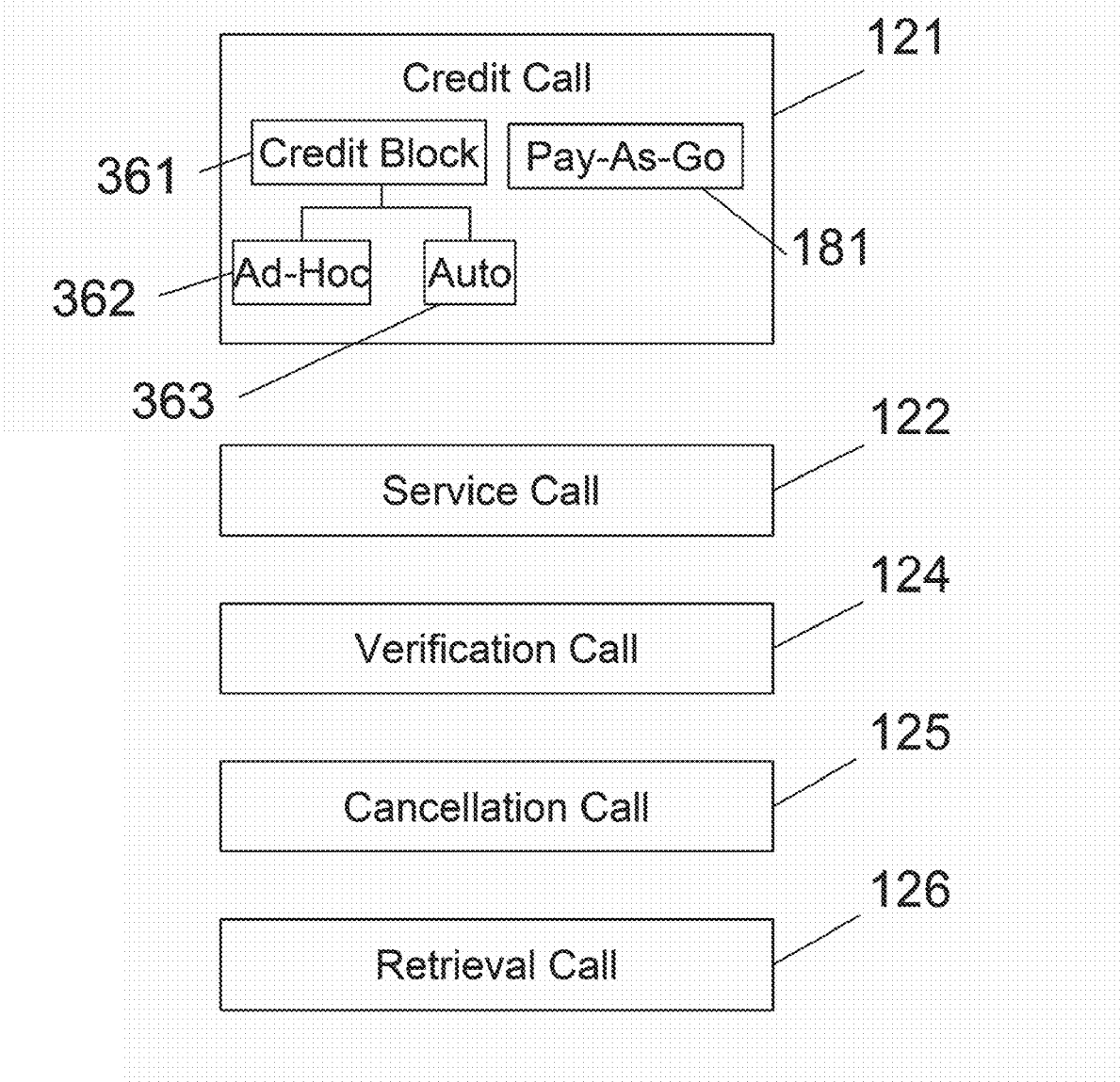
FIG. 11 presents the call types of the WSTC of the certified email system and method of the present invention.

The demanding party sends authenticated calls of various types to the WSTC Application Programming Interface (API) with a number of parameters specifying the details of the request. As illustrated in FIG. 11, the primary call types are the following: credit call 121, service call 122, verification call 124, cancellation call 125, and retrieval call 126. Default parameters are preferably initially set so that calls received in standard format do not need to specify all parameters (e.g., providing party to be used, archiving of data) before accessing the WSTC API.

The credit call deals with the demanding party's time-stamp credits with the WSTC. In a similar manner as the time-stamp credit purchase methods described above and shown in FIG. 10, the demanding party may purchase time stamps in credit blocks 361, either through automatic 363 or ad-hoc purchases 362. A single pricing schedule may be set in a single currency for all demanding parties or special pricing may be established for each demanding party.

The credit call functionality includes the following: credit balance reports, credit usage reports, credit purchase requests (for a specific providing party 90, 110, 299 or for general usage), and credit automation (a number of parameters including threshold at which a specified number of credits are purchased automatically for a specific providing party 90, 110, 299 or for general usage).

The service call functionality that can be requested by the demanding party 20 includes the following services: hash, encrypt, decrypt, sign, archive, providing party request, time-stamping 241, renewal of time stamps, reports of historic time-stamp receipts and transactions.

The verification call can be used to verify a time stamp, either independently or through the TSA from which it was provided. The WSTC can verify the time stamp, upon submission of the original file and the time-stamp receipt; the WSTC can perform verification with less information, but the submission of the original file and the time-stamp receipt allows for an independent check that does not rely on the content of the WSTC database. (This varies from verification 93, done routinely as a cross-check when generating a time stamp for a demanding party 20, in that verification 93 includes confirming that the HASH of the file signature is correct.) In certain situations, however, it may be desirable to perform the verification with the TSA issuer of the time stamp. The verification call returns the date-time stamp of the time stamp, if it is valid, or an error message, if it is not.

Another verification call requests the WSTC to attempt to verify if, and when, an original file has been time-stamped. For example, given only the original file, the WSTC can perform a hash and then search for the regenerated HASH in its database 103 of historic time stamps and related data. If the file HASH is found, the time-stamp receipt can be accessed to complete an independent verification. Similarly, the demanding party 20 can instead provide only the file HASH, only the tracking number, only the file signature HASH, or only the file signature; to find the time-stamp receipt, the database can be searched for the provided data or a key derived from the provided data. The demanding party 20 provides the available information and verification method it wishes to use; the WSTC bases the cost on the method chosen.

A further use of the verification call is employed in situations where a third party was not able to complete a time-stamp request and the demanding party 20 has been advised that the transaction is pending. A verification call from the demanding party 20 can be periodically used to poll the WSTC 50 for an update. Preferably, if the transaction is not complete, the WSTC 50 will recommend a wait time before another verification call to prevent excess traffic. If supported by the demanding party 20, another method is for the WSTC 50 to make a call to the demanding party to advise it when the transaction is no longer pending.

The cancellation call is used by the demanding party 20 to attempt to cancel a time-stamp service call to the WSTC that has not been processed yet. If the transaction has already been processed at the time of the cancellation call, an error message is returned indicating such.

The retrieval call from the demanding party 20 requests retrieval of archived data from the WSTC 50, upon transmission to the WSTC 50 of sufficient information to uniquely identify a time stamp or desired information or files. The information transmitted could include some or all of the following data: the tracking number, the original file, the HASH of the original file, the signed HASH, the time-stamp receipt, the date and time of the time stamp, the TSA(s) used, the archive facilities 110 used, and/or other providing party 299 related information. If more than one transaction performed for the demanding party 20 corresponds to the data submitted, a list of potential time stamps and information or files can be made available to the demanding party 20; subsequent retrieval calls can use the keys provided to make specific requests.

Appropriate authentication is performed before calls are processed. It is preferred that all calls from a specific demanding party 20 come from a fixed IP space.

Demanding Party Administrative Console

Referring now to FIG. 12, the web-based demanding party administrative dashboard or console 170 is accessible to an administrator from the demanding party.

The demanding party administrative dashboard 170 may include the following tools: Payment Processor's Administration Tool 171, Customer Management 172, Authentication Management 173, Digital Signature Management 174, Reporting Tool 175, Pending Transaction List 176, Alert and Notification Tool 177, Expiring Inventory Notification 127, Inventory/Purchase Management 128, and Pending Transaction List 129. The tools are operable to perform the functions named.

The Customer Management Tool 172 preferably allows the administrator to quickly track, manage, and view historical data via the following sub-tools: Search 151, Experience Emulation or Ghosting 152, Account Creation Log 153, Login Log 154, Upload Log 155, Purchase Log 156, Error Log 157, Reporting 158, Account Creation 159, Credit Allocation 147, and Pending Transaction List 148. The sub-tools are operable to perform the functions named.

The Pending Transaction List 148 reports situations where a third party is not able to complete a time-stamp or service request, so the transaction is pending. Temporary receipt reference ID's associated with the pending transactions are listed, as well as any status updates available.

The Notification Tool 177 allows configuration of a variety of alerts and alarms, such as, for example, notifications of expiring time-stamp credits, errors, pending transactions, threshold levels reached, etc.

The Reporting Tool 175 allows the administrator to view a number of reports demonstrating past performance and usage that, in addition to general usage, may be used to help ensure sufficient time-stamp inventory levels are available to meet future needs (when using the credit block purchasing method 361 of FIG. 11).

Through use of the demanding party administrative dashboard 170 the administrator can also manage credit blocks 128 (purchase, view expiration, view history), configure defaults (such as the default TSA or time-stamp notification components), verify a time stamp, search the WSTC database 103 (of its own transactions), and retrieve archived information.

All administrative actions are preferably logged.

WSTC Administrative Dashboard

Referring now to FIG. 13, although most functionality is preferably provided using the WSTC API, the majority of these functions can also be performed through a WSTC administrative web interface or dashboard 160. The web-based WSTC administrative dashboard 160 is preferably accessible to an administrator from the WSTC. All administrative actions are preferably logged.

The WSTC administrative dashboard 160 will give access to the Payment Processor's Administrative Tool 161, Demanding Party Management Tool 162, Authentication Management 163, Digital Signature Management 164, Expiring Inventory Notification Tool 165, Pending Transaction List 166, Inventory Purchase/Management 167, Provider Management Tool 168, and Reporting Tool 169. Each of these WSTC administrative dashboard 160 tools may be expanded to access various functions and to drill down to access more detailed data. A variety of alerts and alarms can be customized to alert the WSTC administrator of the reaching of threshold levels, expiration of inventory, error messages, and the like.

Through use of the WSTC administrative dashboard 160 the WSTC administrator can add and remove demanding party administrators, view reports, manage demanding party credits (sell, issue, returns), manage providing party 90, 110, 299 credits (buy, return), search the database 103, retrieve archived information, manage product bundle creations, and manage price and terms.

The Inventory Purchase/Management Tool 167 allows the administrator to perform any of the following actions: manage blocks of time stamps; purchase and return time stamps; check on the status of time stamps purchased from one or more providing parties 90, including viewing expiration times and usage; and set threshold and expiration alerts.

The Inventory Purchase/Management Tool 167 also allows the administrator to perform any of the following actions: manage blocks of providing party product credits; purchase and return providing party product credits; check on the status of providing party product credits purchased from one or more providing parties 99, including viewing expiration times and usage; and set threshold and expiration alerts.

The Provider Management Tool 168 allows the administrator to add, manage, and change the providing parties 90, 110, 299. When adding a new providing party 90, 110, 299, various issues are considered by the administrator, such as advance or minimum purchase requirements, lead time to adding inventory, pricing and discounts available, relationships between providing parties 90, 110, 299, and expiration of inventory. This information is in turn used in Inventory Purchase and/or Management 167.

The Demanding Party Management Tool 162 allows addition and removal of demanding party administrators; also, the Demanding Party Management Tool 162 allows the WSTC administrator to search and display demanding party administrators and their permissions. For example, a dynamic search tool will allow the WSTC administrator to do a parametric search (by date range, user ID, user name, role, demanding party 20, etc.) that will result in a list of users and a high-level profile. Drilling down will reveal a full profile and the action history, which may be filtered for only specific action types.

The Reporting Tool 169 allows the administrator to generate a number of useful reports (either for an individual demanding party 20 or combining all (or some) demanding parties 20) for management and tracking of financial and service objectives, e.g., inventory purchases (by demanding party 20, by product, by period); revenues (by demanding party 20, by product, by period); and transactions (by demanding party 20, by product, by period).

Security and Hardware

The WSTC 50 and demanding party (or parties) 20 are operable to perform all the functions and services as described herein; some functions and services have been described only in outline form as they can be implemented using standard computing service and software design.

The novel certified email system may run on one or more servers (e.g., web servers configured to receive HTTP requests and to deliver web pages and other files via the HTTP protocol, application servers, database servers, etc.) with Internet feed, firewall, switch, load balancer, and mass storage array that may or may not be shared with other functions. The novel certified email system employs a mail server (e.g., an open source mail server such as Sendmail or Exim) to receive authentication requests by email and to send out receipt notifications. Some of the functionality is preferably duplicated for redundancy. The system may also run in cloud computing virtual environments such as Amazon's EC3.

The modular architecture, allowing maximum flexibility and future expandability, also allows the demanding party (or parties) and the WSTC to be physically located in close proximity, such as in the same rack mount, or to be widely dispersed, such as in different countries. Provision is made for multi-lingual presentations. Security mechanisms are provided, such as, for example, encryption for stored information, a firewall to protect the data files, Secure Sockets Layer (SSL) for passing credit card numbers (and other information requiring secure handling, optionally including customer files), a remote mirror site (for disaster recovery includes real-time streaming), other remote (non-mirroring) backup mechanisms, local mirroring, and local non-mirroring backup, and login authentication using email addresses and passwords or strong authentication including biometrics and/or token devices.

While the certified email system and method of the present invention has been described as applied to a firm, company, or organization in order to describe its complete functionality and applications, any individual can take advantage of most of the functionality herein presented. Hence, the use of the certified email system and method by an individual user is within the scope of the invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

We claim:

1. A system to provide categorization of a time stamp, comprising:
   a time-stamp authority having a secure clock and executing at least one application for performing the function of providing said time stamp; and
   a time-stamping system comprising a processor executing at least one application for performing the functions of:
      receiving a copy of an email from a message originator, said email copy having at least one recipient electronic-delivery address associated therewith that directs transmission of said email to at least one recipient and having a time-stamp system email address associated therewith; wherein said time-stamp system email address has a local-part and has a domain-part that directs transmission of said email copy to said time-stamping system; wherein receipt of said email copy by said time-stamping system comprises a solicitation for said time stamp; and wherein said time-stamp system email address is created by said message originator;
      extracting said local-part and email-transmission data from said email copy; wherein said email-transmission data comprise at least one of a "TO: Address" of said email copy, a "FROM: Address" of said email copy, said time-stamp system email address of said email copy, said recipient electronic-delivery address, a "CC: Address" of said email copy, a "BCC: Address" of said email copy, a portion of an email header of said email copy, an Internet Protocol (IP) address from which said email copy was sent, or transmission data of said email copy;
      preparing said email copy for obtaining said time stamp;
      obtaining said time stamp from said time-stamp authority; and
      utilizing at least one of said local-part or said email-transmission data to provide said categorization of said time stamp by at least associating said time stamp and said email copy with an account accessible to one of said message originator and one of said at least one recipients.

2. The system of claim 1, further comprising:
   a database for storing data accessible to said time-stamping system;
   a web server having access to said data of said database and executing at least one application for performing the functions of:
   providing a website allowing access to said account of at least one of said message originator or said at least one recipient; and
   allowing at least one of said message originator or said at least one recipient to view and retrieve said time stamp through said website.

3. The system of claim 1, wherein said time-stamping system further comprises:
   a demanding party computing system executing at least one application for performing the functions of:
   receiving said email copy; extracting said email-transmission data; preparing said email copy for obtaining said time stamp; associating said time stamp and said email copy with said account; and
   a web services time-stamp conduit executing at least one application for performing the function of obtaining said time stamp from said time-stamp authority.

4. The system of claim 1, wherein said time-stamp system email address comprises at least one IDENTIFIER within said local-part of said time-stamp system email address; wherein said IDENTIFIER is used to provide said categorization of said time stamp; and wherein said at least one IDENTIFIER comprises one or more of:
   a project-associable code associable with a project of said message originator;
   a pseudo-random code associable with said project or client;
   a client-associable code associable with said client of said message originator;
   a TCC:Address password code usable to confirm the identity of said message originator; or
   a message originator-associable code usable to identify said message originator.

5. The system of claim 1, wherein said time-stamping system further utilizes at least one of said local-part or said email-transmission data to provide said categorization of said time stamp by associating said time stamp with a project of said account.

6. The system of claim 1, wherein:
   said time-stamping system is operable to provide a search function operable to search within data associated with said account; and
   said search function is operable to return a search result.

7. The system of claim 1, wherein said time-stamping system further utilizes at least one of said local-part or said email-transmission data to derive billing-associable details usable to provide detailed billing for said message originator by associating the cost for said time stamp with at least one of a client or a project.

8. The system of claim 5, wherein:
   said time-stamping system further comprises a web server configured to provide a website providing access to said account and configured to provide at least one user/participant console associated with said account; and
   one of said at least one user/participant consoles is configured with at least one project folder corresponding to said project and allowing access to said time stamp and to said email copy associated with said project.

9. A system for providing categorization of a time stamp, comprising:
   a time-stamping system comprising an accessible database and a processor executing at least one application for performing the functions of:
      receiving a copy of an email from a message originator, said email copy having at least one recipient electronic-delivery address associated therewith that directs direct transmission of said email to at least one recipient and having a time-stamp system email address associated therewith; wherein said time-stamp system email address has a local-part and has a domain-part that directs transmission of said email copy to said time-stamping system, wherein said receipt of said email copy by said time-stamping system comprises a solicitation for said time stamp, wherein said time-stamp system email address is created by said message originator;
      extracting said local-part and email-transmission data from said email copy; wherein said email-transmission data comprise at least one of a "TO: Address" of said email copy, a "FROM: Address" of said email copy, said time-stamp system email address of said email copy, said recipient electronic-delivery address, a "CC: Address" of said email copy, a "BCC: Address" of said email copy, a portion of an email header of said email copy, an Internet Protocol (IP) address from which said email copy was sent, or transmission data of said email copy;

preparing said email copy for obtaining said time stamp;

obtaining said time stamp; and utilizing at least one of said local-part or said email-transmission data to provide said categorization of said time stamp by associating said time stamp and said email copy with an account accessible to one of said message originator or one of said at least one recipients; and a web server having access to the data of said database and executing at least one application for performing the functions of:

providing a website accessible to said account of at least one of said message originator or said recipient; and allowing at least one of said message originator or said recipient to view and retrieve said time stamp through said website.

10. The system, as recited in claim 9 wherein said time-stamping system comprises:

a demanding party computing system executing at least one application for performing the functions of:

receiving said email copy; extracting said email-transmission data; preparing said email copy for obtaining said time stamp; associating said time stamp and said email copy with said account; and a web services time-stamp conduit executing at least one application for performing the function of obtaining said time stamp from said time-stamp authority.

11. The system as recited in claim 9, wherein said time-stamp system email address comprises at least one IDENTIFIER within said local-part of said time-stamp system email address; wherein said IDENTIFIER is used to provide said categorization of said time stamp; and wherein said at least one IDENTIFIER comprises one or more of:

a project-associable code associable with a project of said message originator;

a pseudo-random code associable with said project or a client;

a client-associable code associable with said client of said message originator;

a TCC:Address password code usable to confirm the identity of said message originator; and a message originator-associable code usable to identify said message originator.

12. The system, as recited in claim 9, wherein said time-stamping system further utilizes at least one of said local-part or said email-transmission data to derive billing-associable details usable to provide detailed billing for said message originator by associating the cost for said time stamp with at least one of a client or a project.

13. The system as recited in claim 9, wherein:

said time-stamping system is operable to provide a search function operable to search within data associated with said account; and said search function is operable to return a search result.

14. A method to provide categorization of a time-stamp, comprising:

receiving, by a time-stamping system comprising a processor for executing at least one application, a copy of an email from a message originator, said email copy having at least one recipient electronic-delivery address associated therewith that directs transmission of said email to at least one recipient and having a time-stamp system email address associated therewith; wherein said time-stamp system email address has a local-part and has a domain-part that directs transmission of said email copy to said time-stamping system; wherein receipt of said email copy by said time-stamping system comprises a solicitation for said time stamp; and wherein said time-stamp system email address is created by said message originator;

extracting, by said time-stamping system, said local-part and email-transmission data from said email copy; wherein said email-transmission data comprise at least one of a "TO: Address" of said email copy, a "FROM: Address" of said email copy, said time-stamp system email address of said email copy, said recipient electronic-delivery address, a "CC: Address" of said email copy, a "BCC: Address" of said email copy, a portion of an email header of said email copy, an Internet Protocol (IP) address from which said email copy was sent, or transmission data of said email copy;

preparing said email copy for obtaining said time stamp;

obtaining said time stamp from a time-stamp authority having a secure clock and executing at least one application for performing the function of providing said time stamp;

utilizing, by said time-stamping system, at least one of said local-part or said email-transmission data to provide said categorization of said time stamp by at least associating said time stamp and said email copy with an account accessible to one of said message originator or one of said at least one recipients.

15. The method of claim 14, wherein said time-stamping system comprises a database for storing data accessible to said time-stamping system, and wherein said method further comprises:

providing a website allowing access to said account, wherein said website is provided by a web server having access to said data of said database and having a processor for executing at least one application; and allowing, by said web server, at least one of said message originator or said at least one recipient to view and retrieve said time stamp through said website.

16. The method of claim 14, wherein said time-stamp system email address comprises at least one IDENTIFIER within the local-part of said time-stamp system email address; wherein said IDENTIFIER is used to provide said categorization of said time stamp; and wherein said at least one IDENTIFIER comprises one or more of:

a project-associable code associable with a project of said message originator;

a pseudo-random code associable with said project or a client;

a client-associable code associable with a client of said message originator;

a TCC:Address password code usable to confirm the identity of said message originator; or a message originator-associable code usable to identify said message originator.

17. The method of claim 14, further comprising:

deriving billing-associable details from at least one of said local-part or said email-transmission data;

associating, by said time-stamping system, the cost for said time stamp with at least one of a client or a project.

18. The method of claim 14, further comprising further utilizing at least one of said local-part or said email-transmission data to provide said categorization of said time stamp by associating said time stamp with a project of said account.

19. The method of claim 14, further comprising:
providing a search function operable to search within data associated with said account upon receipt of input data; and
returning a search result.

20. The system of claim 8, wherein said web server is further configured to provide a corporate administrative console, wherein said corporate administrative console provides administrative tools, wherein said administrative tools include at least one of:
management of said project folder and additional account project folders;
authorization of participants;
authorization of users;
configuration of privileges for said users and said participants;
management of account payments; or
viewing or exporting usage reports.

21. The system of claim 3, wherein said demanding party and said web services time-stamp conduit are embodied in a single architectural element.

22. The system of claim 9, wherein said web server is further configured to provide a corporate administrative console accessible to said message originator, wherein said corporate administrative console provides administrative tools, wherein said administrative tools include at least one of:
management of said project folder and additional account project folders;
authorization of participants;
authorization of users;
configuration of privileges for said users and said participants;
management of account payments; or
viewing or exporting usage reports.

23. The system as recited in claim 9, wherein said time-stamping system further utilizes at least one of said local-part or said email-transmission data to provide said categorization of said time stamp by associating said time stamp with a project of said account.

24. The system, as recited in claim 23, wherein:
said web server is configured to provide access to said account and configured to provide at least one user/participant console associated with said account; and
one of said at least one user/participant consoles is configured with at least one project folder corresponding to said project and allowing access to said time stamp and to said email copy associated with said project.

25. The system of claim 10, wherein said demanding party and said web services time-stamp conduit are embodied in a single architectural element.

26. The method of claim 18, further comprising:
providing at least one user/participant console;
associating said at least one user/participant console with said account;
creating a project folder corresponding to said project;
associating said time stamp and said email copy with said project folder; and
allowing access to an owner of said account to said time stamp and said email copy stored in association with said project folder.

27. The method of claim 26, further comprising:
providing a corporate administrative console;
allowing access by said message originator to said corporate administrative console;
providing administrative tools accessible through said corporate administrative console, wherein said administrative tools include at least one of:
management of said project folder and additional account project folders;
authorization of participants;
authorization of users;
configuration of privileges for said users and said participants;
management of account payments; or
viewing or exporting usage reports.

28. The method of claim 18, further comprising:
providing at least one user/participant console associable with an account of said message originator;
configuring a project folder to correspond to said project;
allowing, upon said authorization of said participant, said participant to access said project folder through said website; and
allowing said participant to view and retrieve said time stamp and said email copy associated with said project folder through said website.

29. The method of claim 14, wherein:
said receiving said email copy is performed by a demanding party computing system executing at least one application;
said extracting said email-transmission data is performed by said demanding party computing system;
said preparing said email copy for obtaining said time stamp is performed by said demanding party computing system;
associating said time stamp and said email copy with said account is performed by said demanding party computing system; and
said obtaining said time stamp from said time-stamp authority is performed by a web services time-stamp conduit executing at least one application.

30. The method of claim 29, wherein said demanding party and said web services time-stamp conduit are embodied in a single architectural element.

* * * * *